United States Patent
Yamamoto et al.

(10) Patent No.: US 6,977,456 B2
(45) Date of Patent: Dec. 20, 2005

(54) CORE HAVING AXIALLY ASSEMBLED CORE SUB-PARTS AND DYNAMO-ELECTRIC MACHINE MEMBER HAVING THE SAME

(75) Inventors: Toshio Yamamoto, Kosai (JP); Shinji Santo, Toyohashi (JP); Yasuhide Ito, Kosai (JP); Masayuki Kuwano, Kosai (JP); Kazumitsu Moriya, Kosai (JP); Takayoshi Suzuki, Toyohashi (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 0 days.

(21) Appl. No.: 11/094,154

(22) Filed: Mar. 31, 2005

(65) Prior Publication Data

US 2005/0168099 A1   Aug. 4, 2005

Related U.S. Application Data

(62) Division of application No. 10/778,174, filed on Feb. 17, 2004, now Pat. No. 6,903,480.

(30) Foreign Application Priority Data

| Feb. 26, 2003 | (JP) | ............................. | 2003-49258 |
| Feb. 26, 2003 | (JP) | ............................. | 2003-49259 |
| Feb. 26, 2003 | (JP) | ............................. | 2003-49260 |

(51) Int. Cl.$^7$ .............................................. H02K 1/00
(52) U.S. Cl. ...................... 310/216; 310/217; 310/218
(58) Field of Search .............................. 310/216–218, 310/254

(56) References Cited

U.S. PATENT DOCUMENTS

| 4,439,703 | A | 3/1984 | Kohzai et al. ............... 310/186 |
| 4,616,151 | A | 10/1986 | Pryjmak ..................... 310/216 |
| 4,816,711 | A | 3/1989 | Fritzsche .................... 310/216 |
| 5,266,859 | A | 11/1993 | Stanley ....................... 310/216 |
| 6,313,557 | B1 | 11/2001 | De Filippis et al. ........ 310/216 |
| 6,313,558 | B1 | 11/2001 | Abukawa et al. |
| 6,329,733 | B1 | 12/2001 | Katsumata et al. ........ 310/90.5 |
| 6,611,076 | B2 | 8/2003 | Lindbery et al. ........... 310/216 |
| 2002/0121831 | A1 | 9/2002 | Egawa et al. |
| 2003/0011272 | A1 | 1/2003 | Kataoka et al. |
| 2004/0113511 | A1 | 6/2004 | Schmidt et al. |

FOREIGN PATENT DOCUMENTS

| JP | A-S60-128840 | 7/1985 |
| JP | A-H09-46941 | 2/1997 |

*Primary Examiner*—Tran Nguyen
(74) *Attorney, Agent, or Firm*—Posz Law Group, PLC

(57) ABSTRACT

Teeth of a first core sub-part and teeth of a second core sub-part are alternately arranged in a circumferential direction. Each tooth has a tooth main body, which may include two tilted portions at two opposed circumferential ends, respectively, of the tooth main body. Each tilted portion is angled relative to a corresponding direction parallel to the axial direction of the core. Each one of the first and second core sub-parts may have fitting recesses and fitting projections, which are engaged with the fitting projections and the fitting recesses of the other one of the first and second core sub-parts. Each tapered wall surface of each fitting recess is angled relative to a corresponding direction parallel to the axial direction. Similarly, each tapered wall surface of each fitting projection is angled relative to a corresponding direction parallel to the axial direction.

7 Claims, 18 Drawing Sheets

CORE HAVING AXIALLY ASSEMBLED CORE SUB-PARTS AND DYNAMO-ELECTRIC MACHINE MEMBER HAVING THE SAME

CROSS REFERENCE TO RELATED APPLICATION

This application is a division of application Ser. No. 10/778,174 filed on Feb. 17, 2004 now U.S. Pat. No. 6,903,480, which is based on and incorporates herein by reference Japanese Patent Application No. 2003-49258 filed on Feb. 26, 2003, Japanese Patent Application No. 2003-49259 filed on Feb. 26, 2003 and Japanese Patent Application No. 2003-49260 filed on Feb. 26, 2003.

BACKGROUND OF THE INVENTION

1. Field of the Invention

The present invention relates to a core of a dynamo-electric machine having a plurality of axially assembled core sub-parts and also relates to a dynamo-electric machine member having such a core and winding wires wound around the core.

2. Description of Related Art

In general, an armature of a dynamo-electric machine, such as a motor, includes a core, around which winding wires are wound. More specifically, the core includes a plurality of radially extending teeth, and the winding wires are wound around the corresponding teeth. One such core disclosed, for example in Japanese Unexamined Patent Publication No. 9-46941, includes a plurality of core sub-parts, which are axially assembled together to form the core. In such a core, circumferentially adjacent teeth of the core are separately provided into the different core sub-parts, so that, for example, one of any two adjacent teeth of the core is provided in one of the core sub-parts, and the other one of the two adjacent teeth is provided in another one of the core sub-parts. In assembly of the core, winding wires are wound around the two adjacent teeth of the core, respectively, while the core sub-parts of the core, which include the two adjacent teeth, respectively, are separated from one another to separate the two adjacent teeth from one another. Thereafter, the core sub-parts are assembled together to form the core. In this way, the adjacent teeth do not interfere with each other in the winding operation of the wires therearound.

In the above motor, two circumferential ends of a tooth main body of each tooth are parallel to an assembling direction of the tooth, i.e., an axial direction of the core. In the above motor, a circumferential space between extended portions of two adjacent teeth, each of which extends circumferentially from a radially outer end of the tooth main body of the corresponding tooth, is relatively large, so that relatively large cogging torque is generated. Furthermore, in the above motor, when a circumferential space between any two adjacent ones of the wires is reduced or when the two adjacent ones of the wires are engaged with one another at a predetermined pressure to increase a space factor of the wires, damage to the wires (e.g., a damage to an insulating film of the wire) could occur due to strong frictional engagement between the wires during a long axial relative movement of the core sub-parts (from an initial stage to a late stage of the axial assembly of the core sub-parts). This would result in short-circuiting between the wires and/or a reduction in yield of the dynamo-electric machines.

Furthermore, in the above core, when the core sub-parts are axially assembled together to form the core, parallel fitting wall surfaces, which are parallel to the axial direction of the core, of a fitting recess (fitting portion) of one of the core sub-parts are engaged with parallel fitting wall surfaces, which are parallel to the axial direction of the core, of a corresponding fitting projection (fitting portion) of another one of the core sub-parts. In a case where the core sub-parts are made by compression molding of magnetic powder, when the core sub-parts are axially assembled together, portions, such as the fitting portions, of the core sub-parts contact, i.e., collide with one another. This may result in cracking or chipping of the core sub-parts. In order to prevent the collision of the core sub-parts, it is conceivable to increase a space between the opposed parallel fitting wall surfaces of the core sub-parts. However, the increase in the space between the opposed parallel fitting wall surfaces disadvantageously causes an increase in magnetoresistance at the space between the opposed parallel fitting wall surfaces. This causes a reduction in efficiency of the motor, which has the above core.

SUMMARY OF THE INVENTION

The present invention addresses the above disadvantages. Thus, it is an objective of the present invention to provide a core of a dynamo-electric machine, which has a plurality of core sub-parts and is capable of addressing the above disadvantages. It is another objective of the present invention to provide a dynamo-electric machine member, which includes such a core and wires wound around the core.

To achieve the objectives of the present invention, there is provided a core for a dynamo-electric machine. The core includes a plurality of core sub-parts, which are assembled together in an axial direction of the core. At least two of the plurality of core sub-parts have at least one tooth. Each tooth has a tooth main body, which includes two tilted portions at two opposed circumferential ends, respectively, of the tooth main body. Each tilted portion is angled relative to a corresponding direction parallel to the axial direction of the core, so that a circumferential width of the tooth main body decreases in an assembling direction of the tooth.

To achieve the objectives of the present invention, there is provided a dynamo-electric machine member for a dynamo-electric machine. The dynamo-electric machine member includes the above described core and a plurality of winding wires, each of which is wound around a corresponding one of the teeth of the core.

To achieve the objectives of the present invention, there is also provided a core for a dynamo-electric machine. The core includes a plurality of core sub-parts, which are assembled together in an axial direction of the core. At least one of the plurality of core sub-parts includes at least one first type fitting portion, each of which has at least one tapered wall surface. Each tapered wall surface of each first type fitting portion is angled relative to a corresponding direction parallel to the axial direction of the core. At least another one of the plurality of core sub-parts includes at least one second type fitting portion, each of which has at least one tapered wall surface. Each tapered wall surface of each second type fitting portion is angled relative to a corresponding direction parallel to the axial direction of the core and is engaged with a corresponding one of the at least one tapered wall surface of an opposed one of the at least one first type fitting portion of a corresponding one of the at least one of the plurality of core sub-parts.

To achieve the objectives of the present invention, there is also provided a core for a dynamo-electric machine. The core includes a plurality of core sub-parts, which are assembled together in an axial direction of the core. At least two of the plurality of core sub-parts have at least one tooth. Each tooth has an extended portion, which is located in a radial end of the tooth and is circumferentially extended from the rest of the tooth. The extended portion of each tooth has at least one length decreasing portion, each of which reduces an axial length of the extended portion toward a circumferential end of the length decreasing portion.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
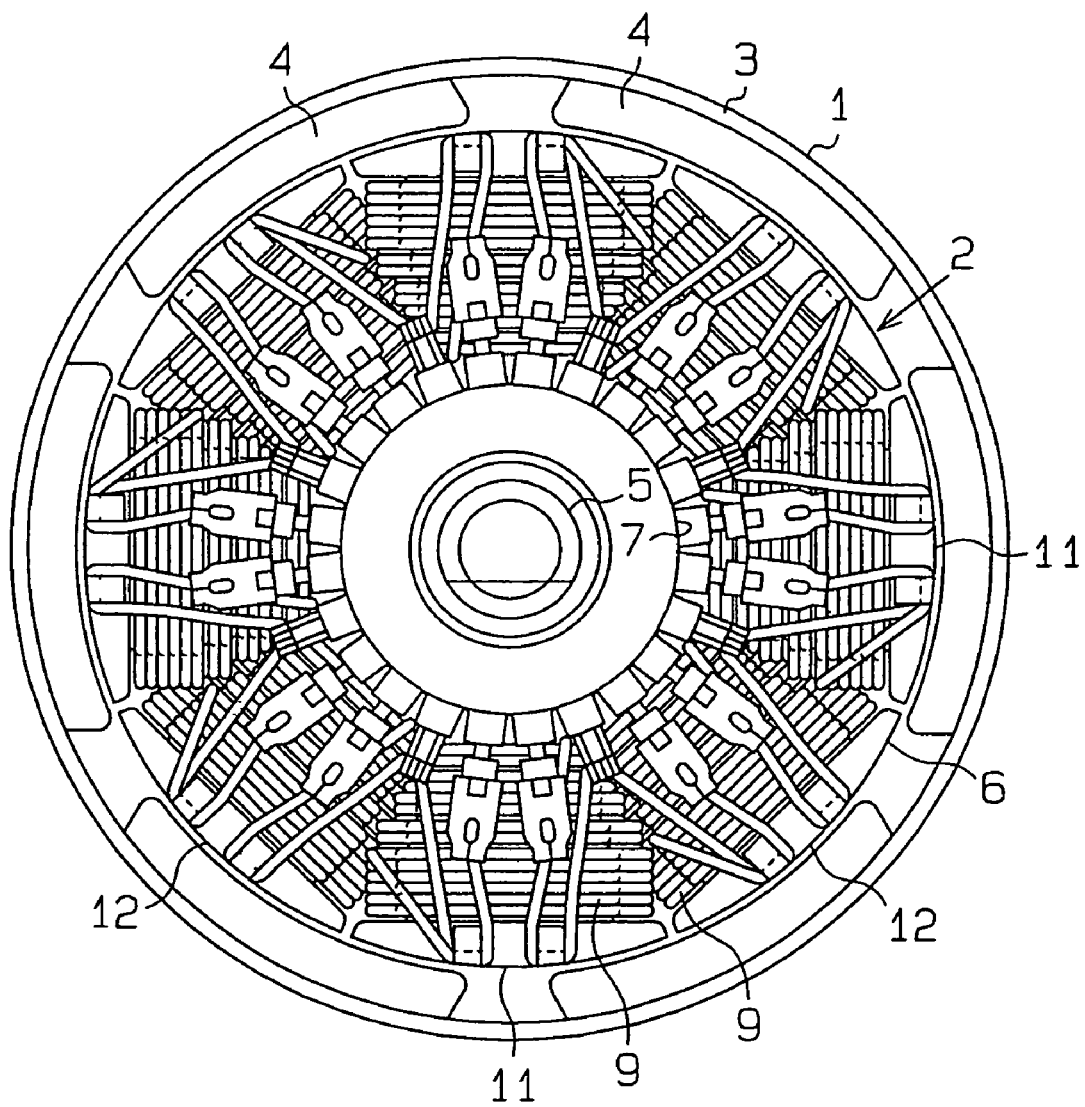
FIG. 1 is a schematic cross sectional view of a motor according to a first embodiment of the present invention.

A first embodiment of the present invention will be described with reference to FIGS. 1 to 6. With reference to FIG. 1, a direct-current motor, which serves as a dynamo-electric machine, includes a stator 1 and a rotor (armature) 2. The stator 1 includes a generally cylindrical yoke 3 and a plurality of magnets 4. The magnets 4 are arranged in the yoke 3. In the stator 1 of the present embodiment, the number of the magnets 4 is six, and these magnets 4 are arranged at generally equal angular intervals along an inner peripheral surface of the yoke 3 and are secured to the inner peripheral surface of the yoke 3.

Figure 2:
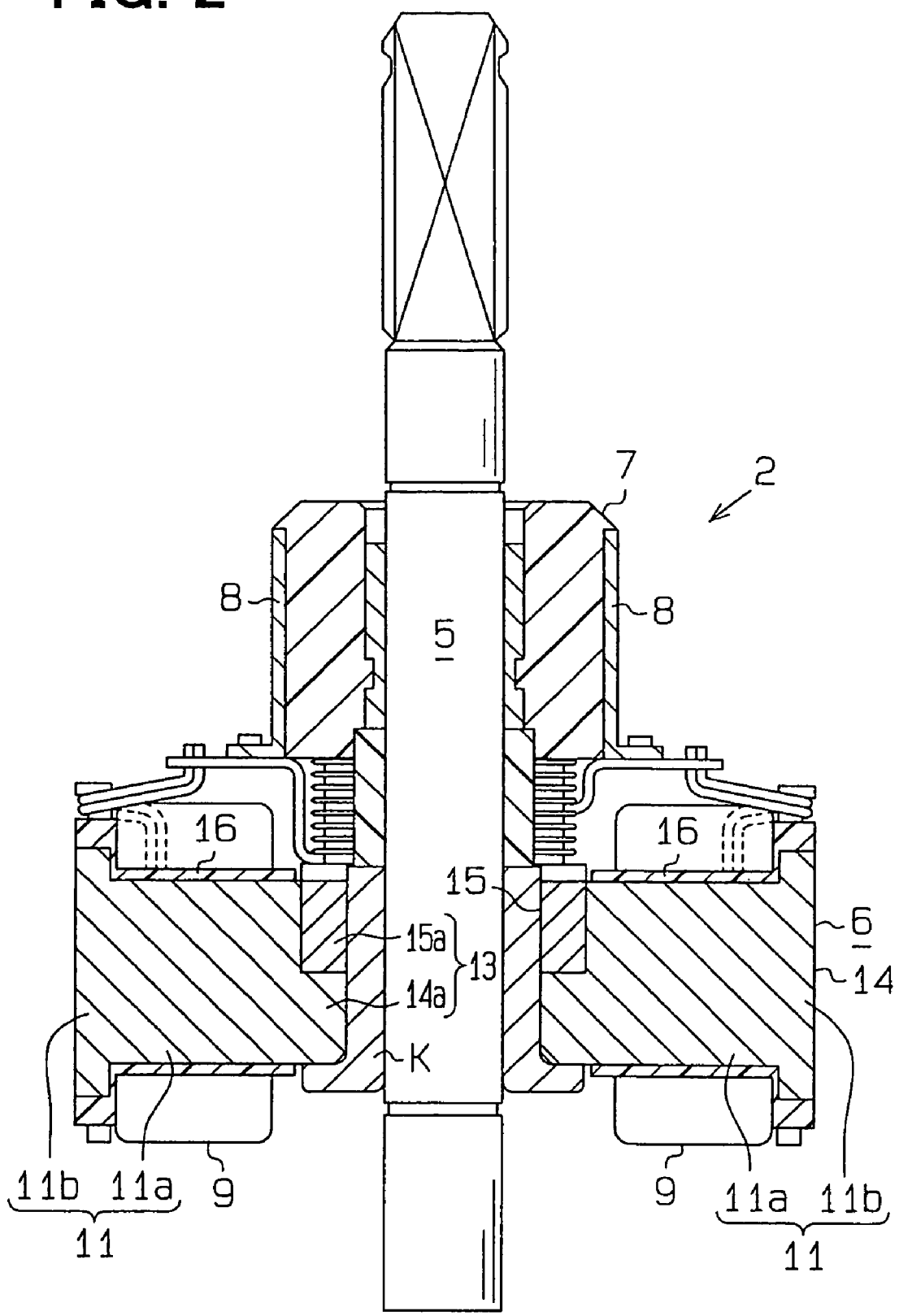
FIG. 2 is a schematic cross sectional view of a rotor of the motor of FIG. 1.

As shown in FIG. 2, the rotor 2 includes a rotatable shaft 5, a core 6 and a commutator 7. The core 6 and the commutator 7 are secured to the rotatable shaft 5. In the yoke 3, axial ends of the rotatable shaft 5 are rotatably supported by bearings (not shown). The commutator 7 includes a plurality of commutator segments 8, which are exposed in an outer peripheral surface of the commutator 7 and are arranged at generally equal angular intervals. In this embodiment, the number of the commutator segments 8 is twenty four. Power supply brushes (not shown) are arranged adjacent to the commutator 7. When direct current, which is supplied from a direct current power source (not shown), is supplied to winding wires 9, which are wound around the core 6, through the power supply brushes and the commutator 7 (commutator segments 8), rotational force is generated due to electromagnetic force generated by the wires 9 and magnetic force of the magnets 4. Thus, the rotor 2 is rotated by the rotational force.

As shown in FIGS. 1 and 2, the core 6 includes a plurality of radially extending teeth 11, 12 and a ring 13 (FIG. 2). The ring 13 connects radially inner ends of the teeth 11, 12 together, as shown in FIG. 2. In the present embodiment, the number of the teeth 11, 12 of the core 6 is eight, and these teeth 11, 12 are arranged at generally equal angular intervals (45 degree intervals) in a circumferential direction in the core 6. The rotatable shaft 5 is inserted into a through hole of the ring 13 via a collar K, so that the core 6 is secured to the rotatable shaft 5.

Figure 3A:
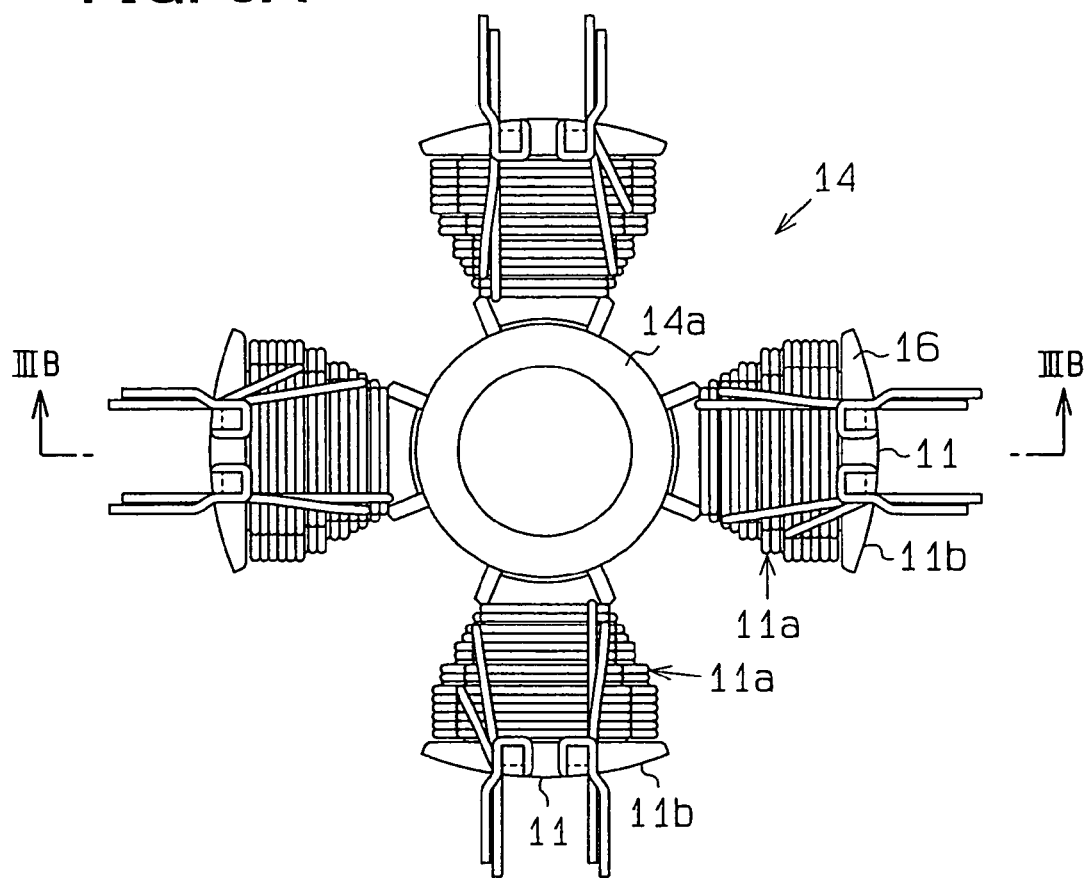
FIG. 3A is a plan view of a first core sub-part of a core of the rotor of FIG. 2.
Figure 3B:
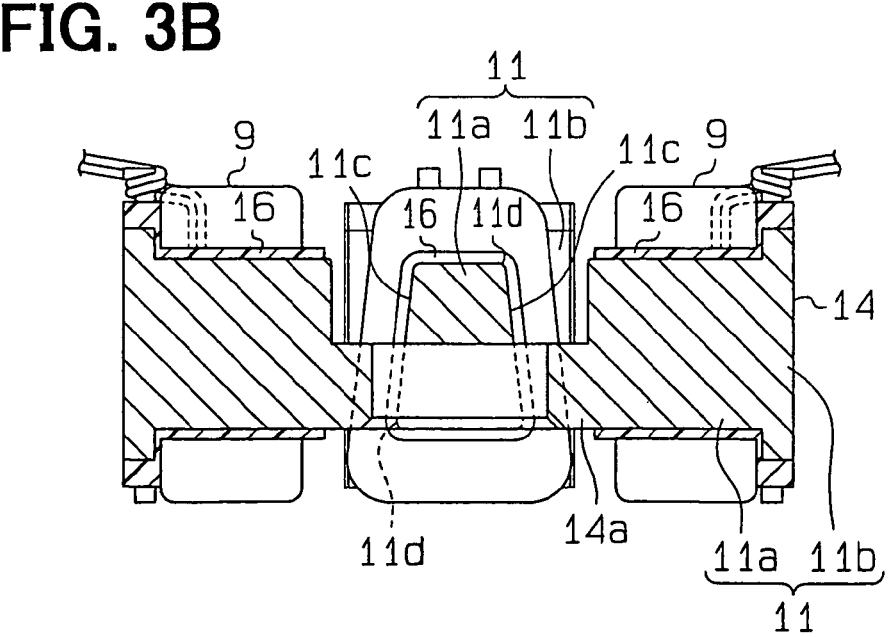
FIG. 3B is a cross sectional view along line IIIB—IIIB in FIG. 3A.
Figure 4A:
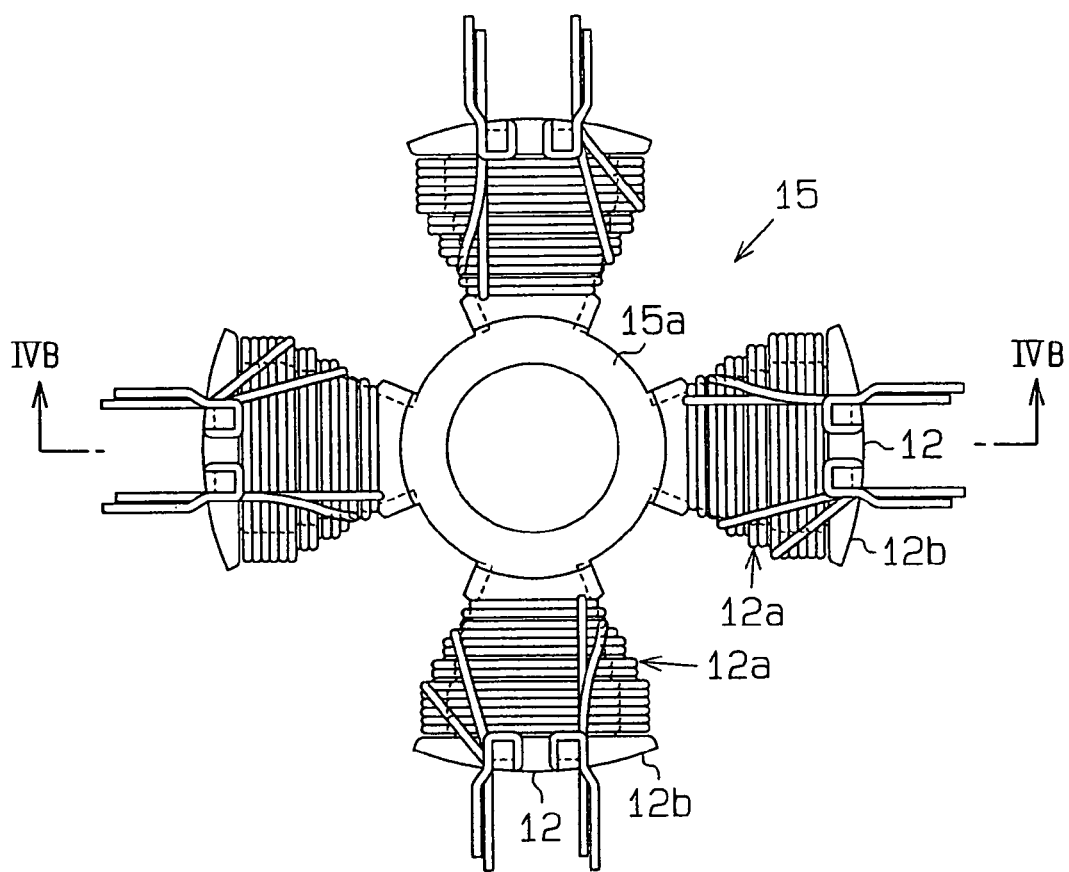
FIG. 4A is a plan view of a second core sub-part of the core of the rotor of FIG. 2.
Figure 4B:
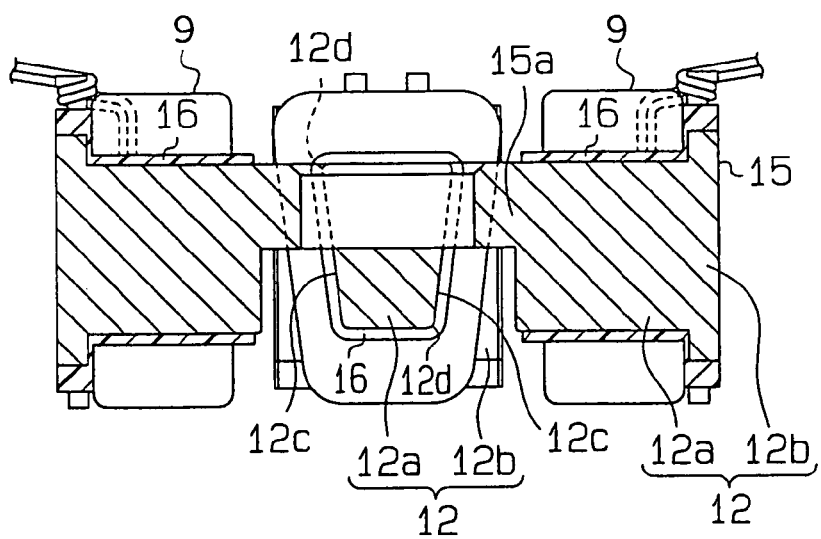
FIG. 4B is a cross sectional view along line IVB—IVB in FIG. 4A.

The core 6 includes a first core sub-part 14 (FIGS. 3A and 3B) and a second core sub-part 15 (FIGS. 4A and 4B), which are axially assembled together. The first core sub-part 14 has one of any two adjacent teeth 11, 12 of the core 6, and the second core sub-part 15 has the other one of the any two adjacent teeth 11, 12. In the present embodiment, the first and second core sub-parts 14, 15 constitute core sub-parts of the present invention and are identical to one another, i.e., have the same product number. Furthermore, each of the first and second core sub-parts 14, 15 is formed by compression molding of magnetic powder that includes powder particles, each of which has an oxide layer provided in its outer surface. FIG. 3A depicts the first core sub-part 14, which is seen from a commutator 7 side of the first core sub-part 14 and around which the wires 9 are wound. FIG. 3B is a cross sectional view of the first core sub-part 14, around which the wires 9 are wound. Similarly, FIG. 4A depicts the second core sub-part 15, which is seen from a commutator 7 side of the second core sub-part 15 and around which the wires 9 are wound. FIG. 4B is a cross sectional view of the second core sub-part 15, around which the wire 9 are wound. In the present embodiment, the core 6 and the wires 9, which are wound around the core 6, constitute a dynamo-electric machine member of the present invention.

Each of the first and second core sub-parts 14, 15 has a ring sub-part 14a, 15a of the ring 13, which constitutes a corresponding axial half of the ring 13. The teeth 11, 12 are provided to the ring sub-parts 14a, 15a such that the teeth 11 of the ring sub-part 14a and the teeth 12 of the ring sub-part 15a are alternately arranged in a circumferential direction of the core 1 when the first core sub-part 14 and the second core sub-part 15 are axially assembled together (FIGS. 1 and 2). More specifically, in the present embodiment, as shown in FIGS. 3A and 4A, each ring sub-part 14a, 15a includes four of the teeth 11, 12 which are arranged at 90 degree intervals. One half of an axial length of each tooth 11, 12 axially projects from a first axial end of the corresponding ring sub-part 14a, 15a (i.e., an upper axial end of the ring sub-part 14a in FIG. 3B and a lower axial end of the ring sub-part 15a in FIG. 4B) to form a projected part, so that the axial length of each tooth 11, 12 substantially coincides with an axial length of the ring 13 when the first core sub-part 14 and the second core sub-part 15 are assembled together.

As shown in FIGS. 3A to 4B, each tooth 11, 12 includes a tooth main body 11a, 12a and an extended portion 11b, 12b. The tooth main body 11a, 12a extends radially outwardly from the corresponding ring sub-part 14a, 15a, and the corresponding wire 9 is wound around the tooth main body 11a, 12a. The extended portion 11b, 12b extends circumferentially from a radially outer end (distal end) of the corresponding tooth main body 11a, 12a. An insulator 16 is provided to a surface of the tooth main body 11a, 12a and axial end surfaces of the extended portion 11b, 12b. In FIGS. 3A and 4A, the tooth main bodies 11a, 12a, around which the wires 9 are wound, are indicated by corresponding arrows and the corresponding numeral 11a, 12a.

Figure 5:
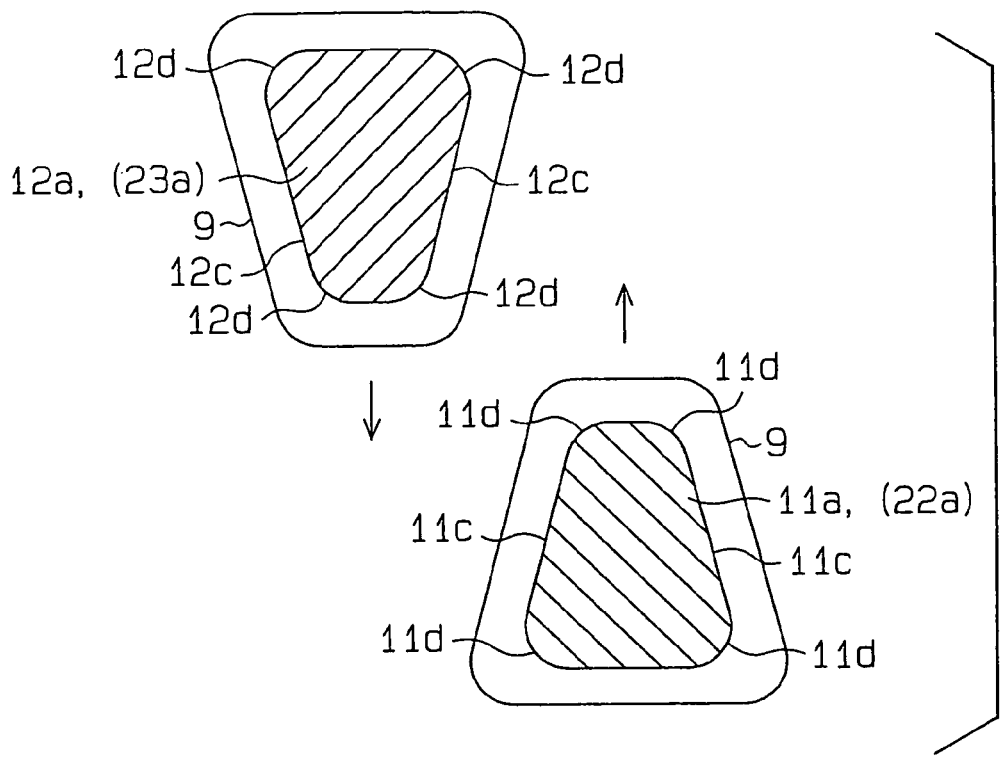
FIG. 5 is a schematic cross sectional view showing cross sections of two teeth together with wires in one stage of assembly of the core of FIG. 2.

Here, as shown in FIGS. 3B and 4B, tilted portions 11c, 12c are provided to circumferential ends, respectively, of each tooth main body 11a, 12a in such a manner that each tilted portion 11c, 12c is tilted relative to a corresponding direction parallel to an axial direction of the core 6 to decrease a circumferential width of the tooth main body 11a, 12a toward an axial distal end (an upper axial end in FIG. 3B and a lower axial end in 4B) of the tooth main body 11a, 12a in an axial assembling direction of the tooth 11, 12 (in an axial projecting direction of the projected part of the tooth 11, 12). Here, it should be noted that the circumferential ends of the tooth main body 11a, 12a are defined as ends of the tooth main body 11a, 12a, which are opposed to one another in the circumferential direction of the core 6, i.e., a rotational direction of the core 6. Furthermore, the circumferential width of the tooth main body 11a, 12a is defined as a size or a length of the tooth main body 11a, 12a, which is measured in the circumferential direction of the core 6. With reference to FIG. 5, a cross section of each tooth main body 11a, 12a, which is located in a plane perpendicular to the radial direction of the core 6, is formed into a generally trapezoidal shape, which has a shorter one (shorter base) of two parallel sides (bases) of the generally trapezoidal cross section in the axial distal end of the tooth main body 11a, 12a in the axial assembling direction (indicated by a corresponding arrow in FIG. 5) of the tooth 11, 12. The tilted portions 11c, 12c are tilted sides (non-parallel sides) of the generally trapezoidal cross section of the tooth main body 11a, 12a, which are tilted, i.e., are angled relative to a corresponding direction parallel to the axial direction (the vertical direction in FIG. 5) of the core 6. In the present embodiment, an angle of the tilted portion 11c, 12c relative to the corresponding direction parallel to the axial direction of the core 6 is generally the same for all the tilted portions 11c, 12c.

Figure 6:
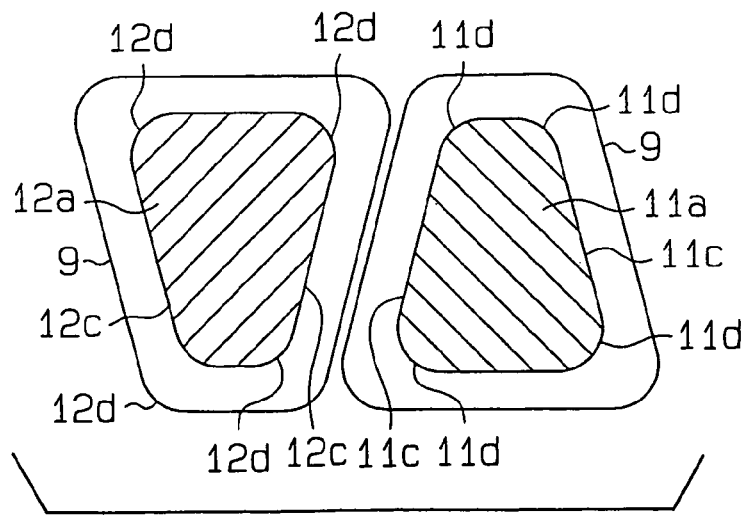
FIG. 6 is another schematic cross sectional view showing the cross sections of the two teeth together with the wires in another stage of the assembly of the core of FIG. 2.

A curved chamfered portion 11d, 12d is formed in a form of a curved wall surface in each of axial ends of each circumferential end of the tooth main body 11a, 12a. That is, each corner of the generally trapezoidal cross section of the tooth main body 11a, 12a is arcuately curved. In the present embodiment, the chamfered portion 11d, 12d is formed in both the axial ends of the tooth main body 11a, 12a at both the circumferential ends of the tooth main body 11a, 12a, i.e., is formed in every corner of the tooth main body 11d, 12d. In FIGS. 5 and 6, the insulator 16 is omitted to schematically show the cross section of the tooth main body 11a, 12a and the corresponding wire 9, which is perpendicular to the radial direction of the core 6.

As shown in FIG. 6, the wire 9 of one of any two adjacent tooth main bodies 11a, 12a partially overlaps with the wire 9 of the other one of the two adjacent tooth main bodies 11a, 12a in the circumferential direction of the core 6 (left-right direction in FIG. 6) in such a manner that the wire 9 of the one of the two adjacent tooth main bodies 11a, 12a does not contact the wire 9 of the other one of the two adjacent tooth main bodies 11a, 12a. In other words, the wire 9 of the one of the two adjacent tooth main bodies 11a, 12a is spaced from the wire 9 of the other one of the two adjacent tooth main bodies 11a, 12a in the circumferential direction of the core 6. Here, the wire 9 of the one of the two adjacent tooth main bodies 11a, 12a does not contact the wire 9 of the other one of the two adjacent tooth main bodies 11a, 12a when the wires 9 are appropriately wound around the corresponding tooth main bodies 11a, 12a by a corresponding winding apparatus.

The wires 9 are wound around the first and second core sub-parts 14, 15 to form concentrated winding while the first and second core sub-parts 14, 15 are still separated from one another in the states shown in FIGS. 3A–4B. At this time, as shown in FIG. 5, the wire 9 forms a generally trapezoidal cross section in the plane perpendicular to the radial direction of the core 6 in such a manner that a shorter one (shorter base) of two parallel sides (bases) of the generally trapezoidal cross section of the wire 9 is located in the axial distal end side of the wound wire 9 in the axial assembling direction (indicated by the corresponding arrow in FIG. 5) of the tooth 11, 12. The first and second core sub-parts 14, 15 are axially relatively moved toward each other while the first and second core sub-parts 14, 15 are axially opposed to one another in such a manner that each of the teeth 11 is displaced by 45 degrees from the corresponding one of the teeth 12, as shown in FIGS. 5 and 6, and the ring sub-parts 14a, 15a are axially stacked one above the other in the axial direction to form the ring 13, as shown in FIG. 1, while each of the teeth 11 is circumferentially displaced by 45 degrees from the adjacent one of the teeth 12. Bond, into which magnetic powder is mixed, is applied to contact surfaces of the ring sub-part 14a and contact surfaces of the ring sub-part 15a, which are engaged together when the first core sub-part 14 and the second core sub-part 15 are axially assembled together. The core 6, which is assembled in the above manner, is secured to the rotatable shaft 5 via the collar K, and the ends of the wires 9 are connected to the commutator 7 (more specifically, to the corresponding commutator segments 8).

Advantages of the above embodiment will be described below.

(1) In the separate state where the first core sub-part 14 is separated from the second core sub-part 15, i.e., where one of any two adjacent teeth 11, 12 is separated from the other one of the two adjacent teeth 11, 12, the winding wires are wound around the corresponding teeth 11, 12. Thus, the adjacent teeth 11, 12 do not interfere with each other in the winding operation of the wires 9 around the corresponding teeth 11, 12, allowing easy winding operation of the wires 9. In other words, the wires 9 are wound around the corresponding teeth 11, 12 while the teeth 11 are separated from the teeth 12. Thus, for example, a sufficient moving space of the winding apparatus (more specifically, a nozzle from which the wire 9 is outputted), which winds the wires 9, can be provided to allow easy winding operation of the wires 9. With the above arrangement, a space between the wire 9 of tooth 11 and the wire 9 of the adjacent tooth 12 can be minimized, allowing an increase in a space factor of the wires 9.

Furthermore, the two tilted portions 11c, 12c, each of which is tilted relative to the corresponding direction parallel to the axial direction of the core 6, are formed in the circumferential ends of the tooth main body 11a, 12a in such a manner that the circumferential width of the tooth main body 11a, 12a decreases toward the axial distal end of the tooth main body 11a, 12a in the assembling direction of the tooth 11, 12. Thus, at the time of axial assembly, there is a reduced possibility of damage to the wire 9 of tooth main body 11a and the wire 9 of the adjacent tooth main body 12a (e.g., brakeage of a dielectric film or insulating film of each wire 9), which would be caused by strong frictional engagement between the adjacent wires 9 during a long axial relative movement of the core sub-parts 14, 15 (from an initial stage to a late stage of the axial assembly). Thus, short-circuiting between the adjacent wires 9 is minimized, and yield can be improved. Furthermore, at the initial stage of the assembly, a circumferential space between the adjacent wires 9 is increased. As a result, even when the first and second core sub-parts 14, 15 are slightly moved to position the first and second core sub-parts 14, 15 relative to each other in the circumferential direction to provide the generally equal angular intervals between the adjacent teeth 11, 12, occurrence of contact (collision) between the wires 9 at the time of the positioning of the first and second core sub-parts 14, 15 can be minimized. Thus, the wires 9 can be easily assembled while the damage to the wires 9 is limited or minimized.

(2) The curved chamfered portions lid, 12d are formed in the axial ends of each circumferential end of the tooth main body 11a, 12a. Thus, each wire 9 can be wound in close contact with the corresponding tooth main body 11a, 12a with no substantial space between the wire 9 and the corresponding tooth main body 11a, 12a. Particularly, in a case where each tooth main body 11a, 12a has a trapezoidal cross section without the chamfered portions 11d, 12d, the opposed ends of the longer base of the trapezoidal cross section form acute angles (acute base angles), and a space is easily formed on both side of an apex of each acutely angled corner of the longer base of the trapezoidal cross section. Contrary to this, in the case of the above tooth main body 11a, 12a, each wire 9 can be easily wound around the corresponding tooth main body 11a, 12a in close contact with the tooth main body 11a, 12a without applying strong pressure to the wire 9. Thus, the wound wire 9 protrudes less in the circumferential direction, and the damage to the wires 9, which would be caused by the strong frictional engagement between the wires 9 during the long axial relative movement of the core sub-parts 14, 15, can be further minimized. Furthermore, the damage to the wires 9 can be limited by the chamfered portions 11d, 12d.

(3) Each of the first and second core sub-parts 14, 15 includes the ring sub-part 14a, 15a of the ring 13, which constitutes the corresponding axial half of the ring 13. The teeth 11, 12 are provided to the ring sub-parts 14a, 15a such that the teeth 11 of the ring sub-part 14a and the teeth 12 of the ring sub-part 15a are alternately arranged in the circumferential direction of the core 6 when the first core sub-part 14 and the second core sub-part 15 are axially assembled together. With this arrangement, each ring sub-part 14a, 15a has multiple (four) teeth 11, 12. In comparison to a case where each core sub-part has a single tooth, the above arrangement allows a reduction in the number of components, i.e., core sub-parts (two in the present embodiment), which are axially assembled together, thereby allowing easy assembly operation of the core 6. Furthermore, the provision of the multiple (four) teeth 11, 12 to each ring sub-part 14a, 15a allows that the space (angle) between the teeth 11 and the space (angle) between the teeth 12 are relatively accurately held constant at the 90 degree interval. Thus, variations in the space between the adjacent teeth 11, 12 can be minimized.

(4) The adjacent wires 9 overlap with one another in the circumferential direction of the core 6 and are spaced from one another in the circumferential direction of the core 6. Here, at least a portion of one of the two adjacent wires 9 overlaps with at least a portion of the other one of the two adjacent wires in a direction parallel to the axial direction of the core 6, as shown in FIG. 6. Thus, a space between the wires 9 can be reduced, and the damage to the wires 9, which would be caused by the strong frictional engagement between the wires 9 during the long axial relative movement of the core sub-parts 14, 15, can be reduced. More specifically, with the above arrangement, even when the wound wire 9 protrudes more than a predetermined amount in the circumferential direction due to formation of a substantial space between the wire 9 and the corresponding tooth main body 11a, 12a, the wire 9 can be easily deformed in a direction other than the protruding direction of the wire 9 when the wire 9 makes frictional engagement with the adjacent wire 9, so that the strong engagement between the adjacent two wires 9 can be limited.

(5) The first and second core sub-parts 14, 15 are identical to one another, i.e., have the same product number, so that the number of types of components of the core 6 (and of the direct-current motor) can be reduced.

The above embodiment can be modified as follows.

In the above embodiment, the core sub-parts of the core 6 include only the first and second core sub-parts 14, 15. However, the core sub-parts of the core 6 can be changed to any other core sub-parts as long as any two adjacent teeth of the core 6 are separately provided in the different core sub-parts.

In the dynamo-electric machine member (the core 6 and the wires 9) of the first embodiment, the adjacent wires 9 do not contact one another, as shown in FIG. 6. Alternatively, the adjacent wires 9 can be engaged with one another at a predetermined pressure. Here, the predetermined pressure is a pressure that does not cause damage to the wires 9 when the wires 9 are engaged with each other at the time of assembly. Furthermore, the predetermined pressure should not cause substantial deformation of the shape of each wound wire 9, i.e., should not cause the wound wires 9 to cause unbalance of the rotor 2 at the time of driving the motor (i.e., at the time of rotating the rotor 2).

In the above embodiment, the curved chamfered portions 11d, 12d are formed in the axial ends of the tooth main body 11a, 12a at the circumferential ends of the tooth main body 11a, 12a. Alternatively, the curved chamfered portions 11d, 12d can be replaced with tapered planar chamfered portions (i.e., tilted planar wall surfaces). Even with this arrangement, each wire can be more easily engaged with the corresponding tooth main body in close contact with substantially no space therebetween in comparison to the tooth main body, which are not chamfered. Furthermore, the tooth main body 11a, 12a can be changed to a tooth main body, which has no chamfered portion 11d, 12d in a trapezoidal cross section of the tooth main body. Even with this modification, a space factor of the wires can be increased, and damage to the wires can be minimized.

In the above embodiment, the first and second core sub-parts 14, 15 are identical to one another, i.e., have the same product number. However, as long as the tilted portion is provided in each tooth main body, the shape of the first core sub-part can be different from the shape of the second core sub-part.

Second Embodiment

A second embodiment of the present invention will be described with reference to FIG. 7.

Figure 7:
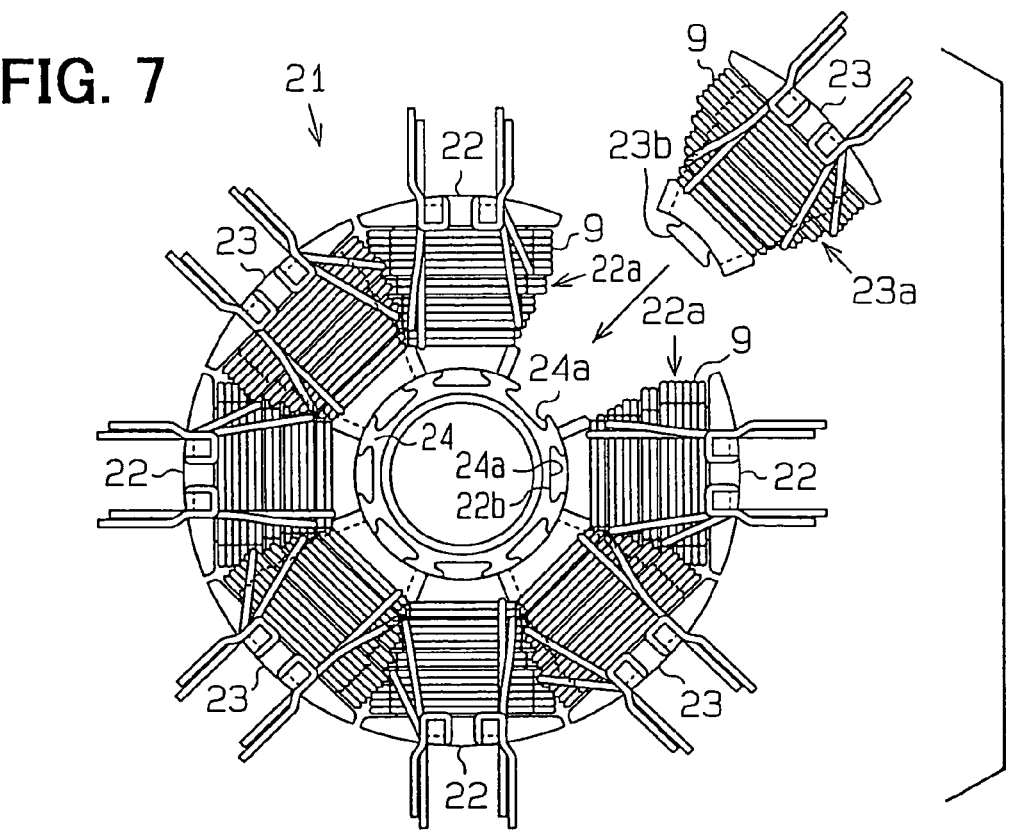
FIG. 7 is a partially exploded plan view of a core according to a second embodiment of the present invention.

With reference to FIG. 7, a core 21 of the present embodiment includes a plurality (eight) of radially extending teeth 22, 23 and a ring 24. Each tooth 22, 23 has a tooth main body 22a, 23a, around which the corresponding wire 9 is wound. Radially inner ends of the teeth 22, 23 are connected by the ring 24. In this instance, each tooth 22, 23 and the ring 24 constitute core sub-parts, which are axially assembled together. In FIG. 7, the tooth main body 22a, 23a, around which the wire 9 is wound, is indicated by the corresponding arrow.

Similar to the above embodiment, two tilted portions, each of which is tilted relative to a corresponding direction parallel to the axial direction of the core 21, are formed in circumferential ends of the tooth main body 22a, 23a in such a manner that a circumferential width of the tooth main body 22a, 23a decreases toward a distal end of the tooth main body 22a, 23a in an assembling direction of the tooth 22, 23 to form a generally trapezoidal cross section in a plane perpendicular to the radial direction of the core 21. A plurality of fitting recesses (first type fitting portions) 24a is formed in the ring 24, and each fitting recess 24a is opened at a radially outer end of the fitting recess 24a and has a generally wedge shaped transverse cross section, as shown in FIG. 7. A fitting projection (second type fitting portion) 22b, 23b is formed in a radially inner end (base end) of each tooth 22, 23.

Winding wires 9 are wound around the teeth 22, 23 (more specifically, the tooth main bodies 22a, 23a ) while the teeth 22, 23 are not assembled to the ring 24. Then, the teeth 22, which are arranged at 90 degree intervals in the assembled core 21, are axially moved to the ring 24, so that the fitting projection 22b of each tooth 22 is engaged with the corresponding one of the fitting recesses 24a. Thereafter, the teeth 23 are axially moved to the ring 24 in such a manner that a shorter axial end of the tooth main body 23a, which has a circumferential width shorter than the other axial end of the tooth main body 23a, becomes a leading end of the tooth main body 23a and is moved toward the ring 24 in the axial direction. Then, the fitting projection 23b of each tooth 23 is engaged with the corresponding fitting recess 24a of the ring 24. Even with this arrangement, a space factor of the wires 9 is increased, and damage to the wires 9 can be minimized. Furthermore, each tooth 22, 23 and the ring 24, which connect the radially inner ends of the teeth 22, 23 together, constitute the core sub-parts. Thus, the core sub-parts are simplified. Furthermore, each wire 9 is wound around the corresponding tooth 22, 23 while the tooth 22, 23 is separated from the ring 24, so that the wire 9 can be wound around the tooth 22, 23 without being interfered by other teeth 22, 23 or the ring 24.

Third Embodiment

A third embodiment of the present invention will be described with reference to FIGS. 8 and 9.

Figure 8:
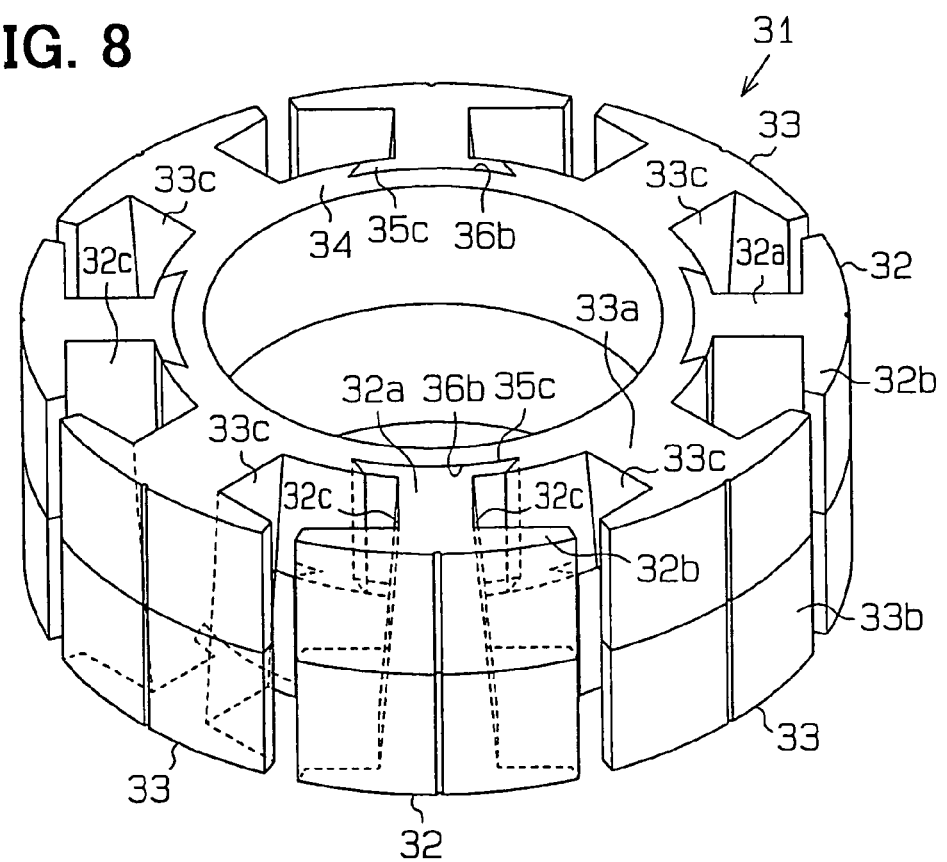
FIG. 8 is a perspective view of a core according to a third embodiment of the present invention.

With reference to FIG. 8, a core 31 of the present embodiment includes a plurality of radially extending teeth 32, 33 and a ring 34. The ring 34 connects radially inner ends of the teeth 32, 33 together. As shown in FIG. 9, the core 31 includes a first core sub-part 35 and a second core sub-part 36, which are axially assembled together. The first core sub-part 35 includes the teeth 32, and the second core sub-part 36 includes the teeth 33.

One half of an axial length of each tooth 32, 33 axially projects from a first axial end of a corresponding ring sub-part 35a, 36a of the ring 34 (i.e., an upper axial end of the ring sub-part 35a in FIG. 9 and a lower axial end of the ring sub-part 36a in FIG. 9) to form a projected part, so that the axial length of each tooth 32, 33 substantially coincides with an axial length of the ring 34 when the first core sub-part 35 and the second core sub-part 36 are assembled together. As shown in FIG. 9, fitting recesses (first type fitting portions) 35b, 36b and fitting projections (second type fitting portions) 35c, 36c are formed in each of the first and second core sub-parts 35, 36. Each fitting recess 35b, 36b is circumferentially arranged between corresponding two of the teeth 32, 33 of the corresponding ring sub-part 35a, 36a and is opened at a radially outer end of the fitting recess 35b, 36b. Furthermore, a circumferential width (circumferential space) of each fitting recess 35b, 36b measured in the circumferential direction of the core 31 increases from the radially outer end of the fitting recess 35b, 36b toward a radially inner end of the fitting recess 35b, 36b, so that each fitting recess 35b, 36b has a wedge shaped transverse cross section in a plane perpendicular to an axial direction of the core 31. Furthermore, each fitting projection 35c, 36c is formed in the projected part of the radially inner end (proximal end) of the corresponding tooth 32, 33, which projects axially from the corresponding ring sub-part 35a, 36a, to have a shape that corresponds to the corresponding fitting recess 35b, 36b, i.e., to have a circumferential width, which is measured in the circumferential direction of the core 31 and increases from a radially outer end of the fitting projection 35c, 36c toward a radially inner end of the fitting projection 35c, 36c.

Each tooth 32, 33 includes a tooth main body 32a, 33a and an extended portion 32b, 33b. The tooth main body 32a, 33a extends radially outwardly from the ring sub-part 35a, 36a, and the corresponding wire is wound around the tooth main body 32a, 33a. The extended portion 32b, 33b extends circumferentially from a radially outer end (distal end) of the corresponding tooth main body 32a, 33a.

Similar to the first and second embodiments, two tilted portions 32c, 33c are provided to circumferential ends, respectively, of the tooth main body 32a, 33a of each tooth 32, 33 in such a manner that the tilted portions 32c, 33c are tilted, i.e., are angled relative to a corresponding direction parallel to the axial direction of the core 31 to decrease a circumferential width of the tooth main body 32a, 33a toward an axial distal end of the tooth main body 32a, 33a in an assembling direction of the tooth 32, 33. That is, a cross section of each tooth main body 32a, 33a, which is located in a plane perpendicular to the radial direction of the tooth main body 32a, 33a, is formed into a generally trapezoidal shape, which has a shorter one (shorter base) of two parallel sides (bases) of the generally trapezoidal cross section in the axial distal end of the tooth main body 32a, 33a in the axial assembling direction of the tooth 32, 33.

Figure 9:
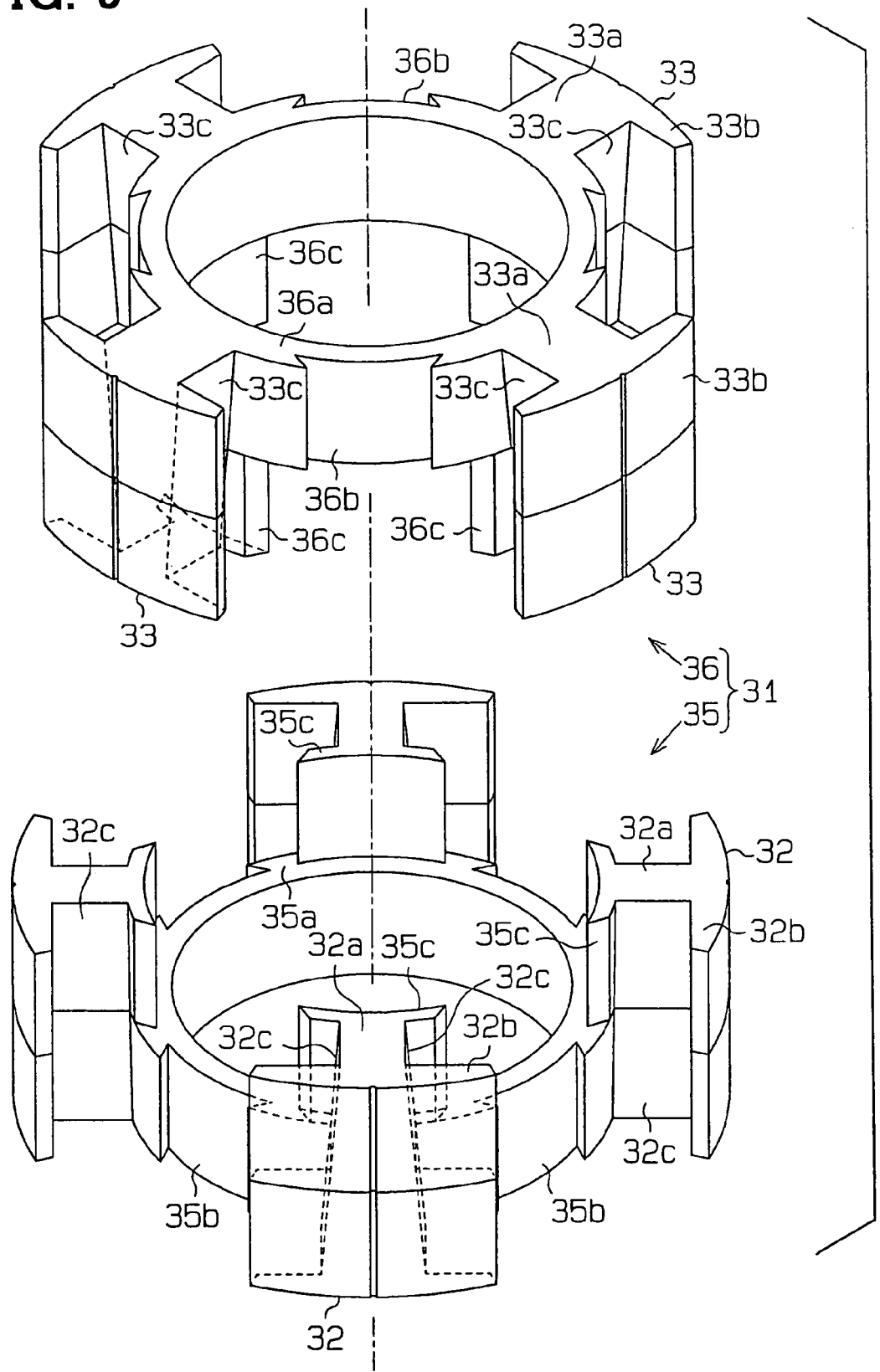
FIG. 9 is an exploded perspective view of the core of FIG. 8.

The first and second core sub-parts 35, 36 are axially relatively moved toward each other while the first and second core sub-parts 35, 36 are axially opposed to one another in such a manner that each of the teeth 32 is displaced by 45 degrees from the corresponding one of the teeth 33, as shown in FIG. 9, and the fitting projections 35c, 36c are engaged with the corresponding fitting recesses 35b, 36b, as shown in FIG. 8. Even with this embodiment, similar to the above embodiments, a space factor of the wires can be increased, and damage to the wires can be minimized.

Fourth Embodiment

A fourth embodiment of the present invention will be described with reference to FIGS. 10 and 11. A core of the present invention is substantially the same as that of the first embodiment. Thus, only differences between the fourth embodiment and the first embodiment will be described below. Furthermore, components similar to the first embodiment will be indicated by the same numerals and will not be described further for the sake of simplicity.

Figure 10:
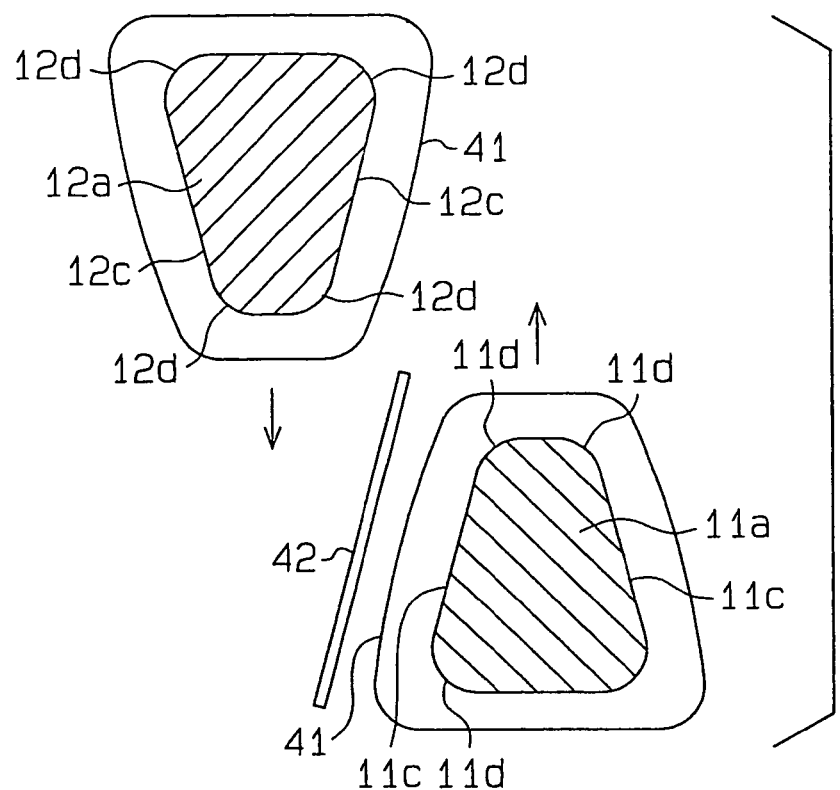
FIG. 10 is a schematic cross sectional view showing cross sections of two teeth together with wires in one stage of assembly of a core according to a fourth embodiment of the present invention.
Figure 11:
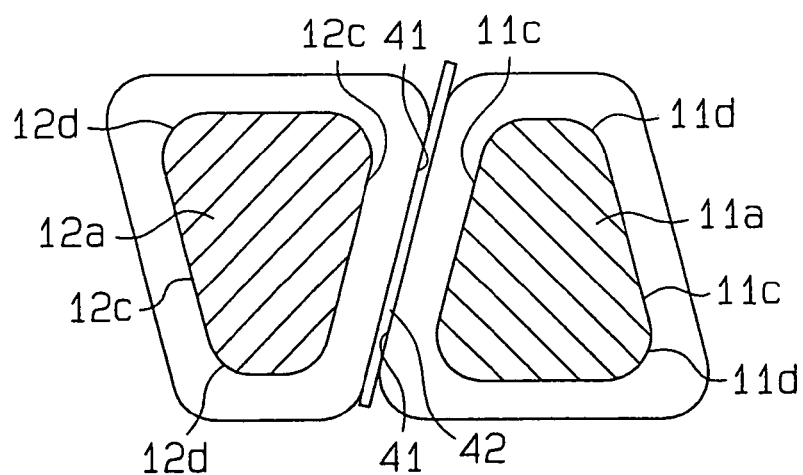
FIG. 11 is another schematic cross sectional view showing the cross sections of the two teeth together with the wires in another stage of the assembly of the core of FIG. 10.

With reference to FIGS. 10 and 11, winding wires 41, which are wound around adjacent tooth main bodies 11a, 12a, respectively, are overlapped with one another in a circumferential direction of the core (left-right direction in FIG. 11). Furthermore, the adjacent wires 41 are engaged with one another at a predetermined pressure in the circumferential direction of the core. In the present instance, the adjacent wires 41 are engaged with one another at the predetermined pressure via a dielectric sheet, i.e., an insulating sheet (e.g., an insulating paper) 42.

With this arrangement, due to the tilted portions 11c, 12c of each tooth main body 11a, 12a, the adjacent wires 41 do not engage with one another in the initial stage of the axial assembly (FIG. 10) but are engaged with one another through the dielectric sheet 42 at the late stage of the axial assembly (FIG. 11). Thus, a space factor of the wires 41 is increased. Furthermore, damage to the wires 41, which would be caused by strong frictional engagement between the wires 41 during a long axial relative movement of the core sub-parts 14, 15, can be minimized. Also, since the adjacent wires 41 are engaged with one another at the predetermined pressure, the shape of the entire wires 41 do not deform easily, i.e., the wires 41 do not cause unbalance of the rotor 2. Thus, vibrations and noises are reduced at the time of driving the motor (time of driving the rotor 2). Furthermore, in comparison to the case where deformation of the shape of the wires is limited by impregnation of bond or a resin material into spaces between the wires, the above arrangement does not require the bond or the resin. Thus, a reduction in the weight of the rotor 2 (dynamo-electric machine member) and a reduction in the costs can be achieved.

Furthermore, the adjacent wires 41 are engaged with one another at the predetermined pressure via the dielectric sheet 42. Thus, for example, at the time of axial assembly, even when the wires 41 are frictionally engaged with one another via the dielectric sheet 42 and thus are damaged, short-circuiting between the adjacent wires 41 can be limited.

Fifth Embodiment

A core according to a fifth embodiment of the present invention will be described with reference to FIGS. 12 and 13. The core 101 is provided in an armature of a direct-current motor, which serves as a dynamo-electric machine of the present invention, and wires are wound around the core 101.

Figure 13:
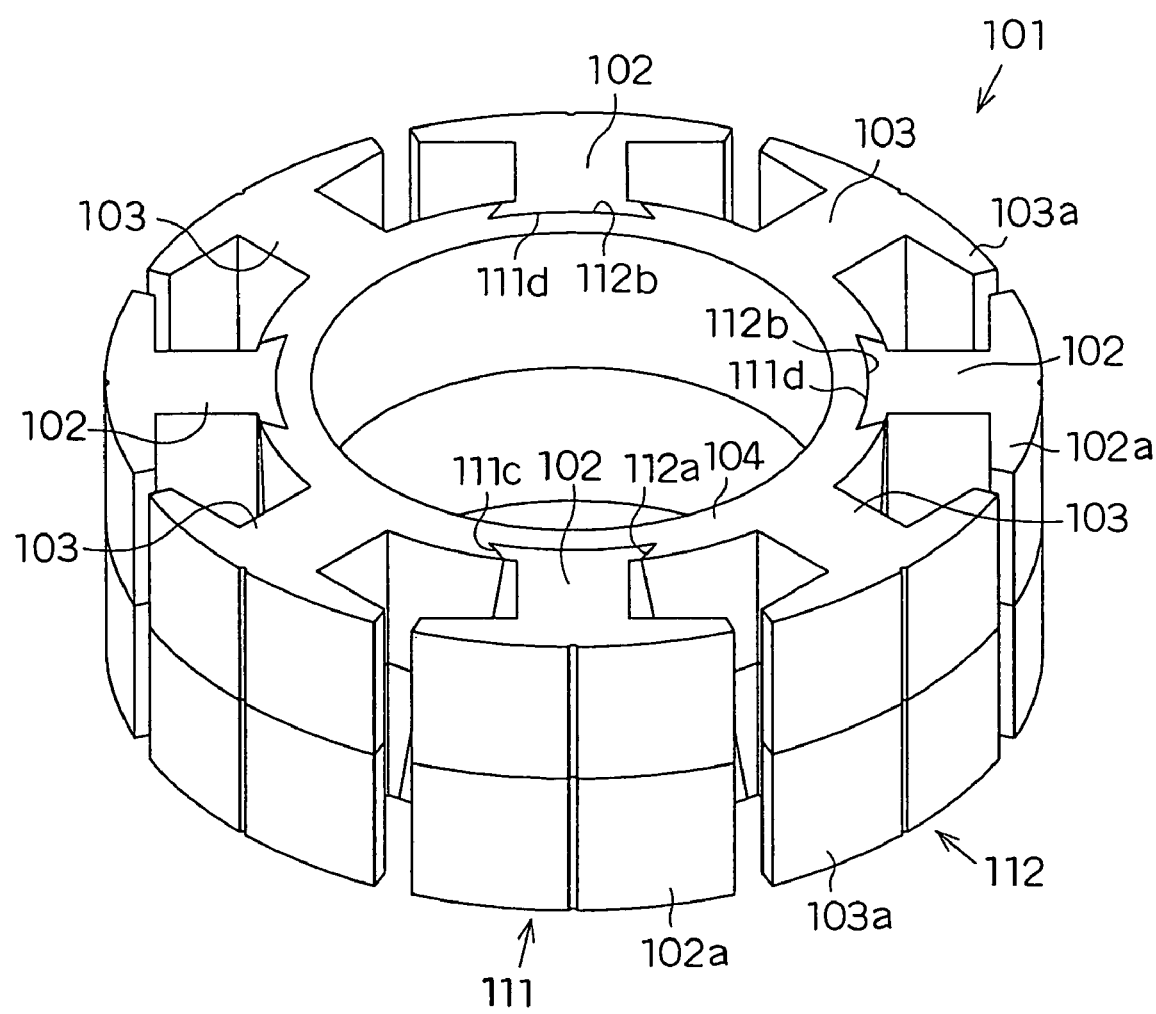
FIG. 13 is a perspective view of the core of FIG. 12.

As shown in FIG. 13, the core 101 includes a plurality of radially extending teeth 102, 103 and a ring 104. The ring 104 connects radially inner ends (proximal ends) of the teeth 102, 103 together, and winding wires (not shown) are wound around the corresponding teeth 102, 103. In the present embodiment, the number of the teeth 102, 103 is eight, and the eight teeth 102, 103 are arranged at generally equal angular intervals (i.e., 45 degree intervals). An extended portion 102a, 103a is provided to a radially outer end (distal end) of each tooth 102, 103 and circumferentially extends from the tooth 102, 103.

Figure 12:
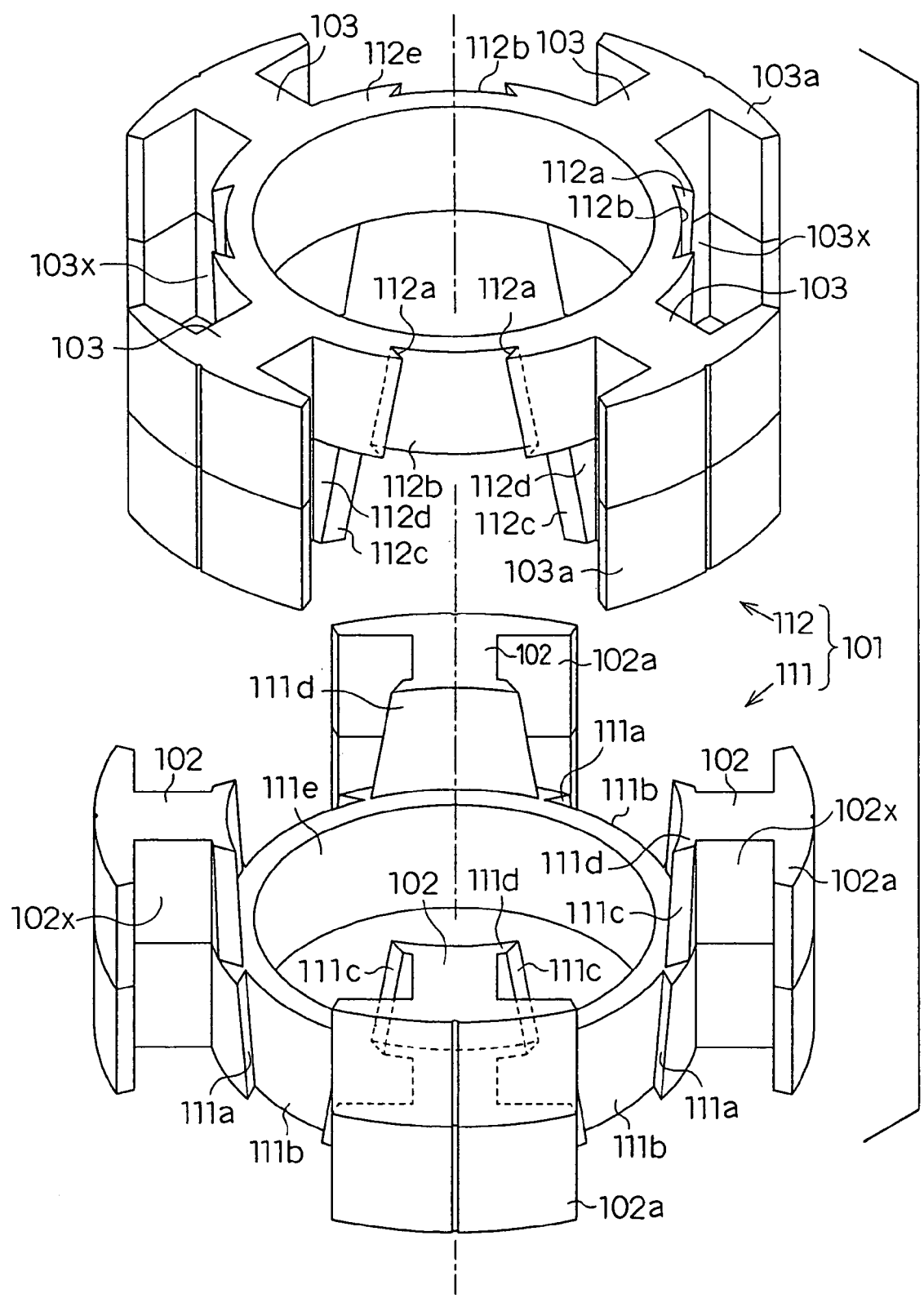
FIG. 12 is an exploded perspective view of a core according to a fifth embodiment of the present invention.

As shown in FIG. 12, the core 101 includes a first core sub-part 111 and a second core sub-part 112, which are axially assembled together to form the core 101. The first core sub-part 111 serves as a receiving member, and the second core sub-part 112 serves as an installable member, which is installable to the receiving member. Each of the first and second core sub-parts 111, 112 is formed by compression molding of magnetic powder that includes powder particles, each of which has an oxide layer provided in its outer surface. In the present embodiment, the first core sub-part 111 and the second core sub-part 112 are identical to one another, i.e., have,the same product number.

As shown in FIG. 12, each core sub-part 111, 112 includes a plurality of fitting recesses 111b, 112b, each of which serves as a receiving fitting portion (or alternatively referred to as a first type fitting portion) of the present invention and includes two tapered wall surfaces 111a, 112a. Each tapered wall surface 111a, 112a is tilted, i.e., is angled relative to a direction parallel to an axial direction of the core 101. Furthermore, each core sub-part 111, 112 includes a plurality of fitting projections 111d, 112d, each of which serves as an installable fitting portion (or alternatively referred to as a second type fitting portion) of the present invention and includes two tapered wall surfaces 111c, 112c. Each tapered wall surface 111c, 112c is tilted, i.e., is angled relative to a direction parallel to the axial direction of the core 101. The first core sub-part 111 and the second core sub-part 112 are assembled together in such a manner that the fitting projections 111d, 112d are fitted into, i.e., are engaged with the corresponding fitting recesses 112b, 111b, and the tapered wall surfaces 111a, 112a are engaged with the corresponding tapered wall surfaces 112c, 111c.

Specifically, each core sub-part 111, 112 includes a ring sub-part 111e, 112e of the ring 104, which constitutes a corresponding axial half of the ring 104. The teeth 102, 103 are provided to the ring sub-parts 111e, 112e such that the teeth 102 of the ring sub-part 111e and the teeth 103 of the ring sub-part 112e are alternately arranged in a circumferential direction of the core 101 when the first core sub-part 111 and the second core sub-part 112 are axially assembled together (FIG. 13). More specifically, in the present embodiment, each ring sub-part 111e, 112e includes four of the teeth 102, 103 which are arranged at 90 degree intervals. One half of an axial length of each tooth 102, 103 axially projects from a first axial end of the corresponding ring sub-part 111e, 112e (i.e., the upper axial end of the ring sub-part 111e and the lower axial end of the ring sub-part 112e in FIG. 12) to form a projected part 102x, 103x, so that the axial length of each tooth 102, 103 substantially coincides with an axial length of the ring 104 when the first core sub-part 111 and the second core sub-part 112 are assembled together, as shown in FIG. 13.

In each ring sub-part 111e, 112e, each fitting recess 111b, 112b is circumferentially arranged between corresponding two of the teeth 102, 103 of the ring sub-part 111e, 112e. Furthermore, a radially outer part of each fitting recess 111b, 112b is opened, and each fitting recess 111b, 112b has a circumferential width (i.e., a circumferential space), which increases from a radially outer part of the fitting recess 111b, 112b toward a radially inner part of the fitting recess 111b, 112b. That is, each tapered wall surface 111a, 112a of each fitting recess 111b, 112b is angled relative to a corresponding radial direction of the core 101. In other words, a transverse cross section of each fitting recess 111b, 112b, which is located in a plane perpendicular to the axial direction of the core 101, has a wedge shape. The two tapered wall surfaces 111a, 112a, each of which is angled relative to the direction parallel to the axial direction of the core 101, are provided to two opposed circumferential wall surfaces (i.e., two circumferential end wall surfaces), respectively, of the fitting recess 111b, 112b. More specifically, the two tapered wall surfaces 111a, 112a of each fitting recess 111b, 112b are angled such that the circumferential width (i.e., the circumferential space), which is measured in the circumferential direction of the core 101, between the two tapered wall surfaces 111a, 112a increases from a second axial end of the ring sub-part 111e, 112e, which is opposite from the first axial end of the ring sub-part 111e, 112e, toward the first axial end of the ring sub-part 111e, 112e. In other words, the circumferential width (i.e., the circumferential space) between the two tapered wall surfaces 111a, 112a of the fitting recess 111b, 112b of one of the first and second core sub-parts 111, 112 increases toward the other one of the first and second core sub-parts 111, 112, i.e., increases in an axial assembling direction of the one of the first and second core sub-parts 111, 112 relative to the other one of the first and second core sub-parts 112, 111 (i.e., a projecting direction of the projected part 102a, 103a ). That is, the circumferential space between the tapered wall surfaces 111a, 112a of each fitting recess 111b, 112b is widened in the assembling direction of the core sub-part 111, 112.

Each fitting projection 111d, 112d is formed in the projected part 102x, 103x of the corresponding tooth 102, 103, which axially projects from the first axial end of the ring sub-part 111e, 112e, in such a manner that the fitting projection 111d, 112d is formed along the radially inner end (proximal end) of the projected part 102x, 103x of the corresponding tooth 102, 103. Each fitting projection 111d, 112d is formed into a shape that corresponds to the corresponding fitting recess 111b, 112b, so that a circumferential width of the fitting projection 111d, 112d increases from a radially outer part of the fitting projection 111d, 112d toward a radially inner part of the fitting projection 111d, 112d. Furthermore, the two tapered wall surfaces 111c, 112c, each of which is angled to the direction parallel to the axial direction of the core 101, are provided to two opposed circumferential wall surfaces, respectively, of the fitting projection 111d, 112d. The two tapered wall surfaces 111c, 112c of the fitting projection 111d, 112d are angled such that a circumferential width between the tapered wall surfaces 111c, 112c decreases from the second axial end of the core sub-part 111, 112 toward the first axial end of the core sub-part 111, 112. In other words, the circumferential width (i.e., the circumferential space) between the two tapered wall surfaces 111c, 112c of the fitting projection 111d, 112d of one of the first and second core sub-parts 111, 112 decreases toward the other one of the first and second core sub-parts 111, 112, i.e., decreases in the axial assembling direction of the one of the first and second core sub-parts 111, 112. That is, the circumferential space between the tapered wall surfaces 111c, 112c of each fitting projection 111d, 112d is narrowed in the assembling direction of the core sub-part 111, 112.

The winding wires are wound around the corresponding teeth 102, 103 of each of the first and second core sub-parts 111, 112 to form concentrated winding while the first and second core sub-parts 111, 112 are still separated from one another. Thereafter, the first core sub-part 111 and the second core sub-part 112 are axially opposed to one another in such a manner that each tooth 102, 103 of one of the first and second core sub-parts 111, 112 is circumferentially displaced by 45 degrees from a circumferentially adjacent one of the teeth 102, 103 of the other one of the first and second core sub-parts 111, 112. Then, the second core sub-part 112 is axially installed to the first core sub-part 111, so that the fitting projections 111d, 112d are engaged with the fitting recesses 112b, 111b, and the tapered wall surfaces 111c, 112c are engaged with the tapered wall surfaces 112a, 111a. Furthermore, at the time of assembly, bond, into which magnetic powder is mixed, is applied to the fitting projections 111d, 112d and to the fitting recesses 111b, 112b. Thus, the fitting projections 111d, 112d are bonded with the corresponding fitting recesses 111b, 112b when the fitting projections 111d, 112d are engaged with the corresponding fitting recesses 112b, 111b.

Next, advantages of the fifth embodiment will be described.

(1) In the initial stage of the assembling operation of the first core sub-part 111 and the second core sub-part 112, i.e., in the stage where a leading axial end of each fitting projection 111d, 112d begins to overlap with the corresponding fitting recess 112b, 111b, a relatively large circumferential space is provided between each circumferential wall surface of the fitting recess 111b, 112b and the corresponding opposed circumferential wall surface of the corresponding fitting projection 111d, 112d due to the tapered wall surfaces 111a, 112a, 111c, 112c provided to the circumferential wall surfaces of the fitting recess 111b, 112b and of the fitting projection 111d, 112d. In other words, in the initial stage, a portion of each fitting projection 111d, 112d, which has a relatively small circumferential width (i.e., a relatively small circumferential space) between the two tapered wall surfaces 111c, 112c of the fitting projection 111d, 112d, is fitted into a portion of the corresponding fitting recess 111b, 112b, which has a relatively large circumferential width (i.e., a relatively large circumferential space) between the two tapered wall surfaces 112a, 111a of the fitting recess 112b, 111b. With this arrangement, even when positional accuracies of each fitting projection 111d, 112d and of the corresponding fitting recess 111b, 112b are not relatively high, a possibility of collision between the fitting projection 111d, 112d and the corresponding fitting recess 112b, 111b can be reduced. As a result, occurrence of cracking or chipping of the core sub-parts 111, 112, which would be caused by the collision, can be reduced.

Furthermore, in the assembling operation of the first core sub-part 111 and the second core sub-part 112, when each fitting projection 111d, 112d is further axially advanced to axially overlap in a greater amount with the corresponding fitting recess 112b, 111b, the first core sub-part 111 and the second core sub-part 112 can be positioned to their desired positions, respectively. This is due to the engagement between the tapered wall surfaces 111c, 112c of each fitting projection 111d, 112d and the tapered wall surfaces 112a, 111a of the corresponding fitting recess 112b, 111b, which guide the first core sub-part 111 and the second core sub-part 112 to the desired positions, respectively, even when the initial relative positions of the first core sub-part 111 and of the second core sub-part 112 are substantially deviated from the desired positions. Thus, it is not required to provide highly accurate assembling apparatus to assemble the first core sub-part 111 and the second core sub-part 112 together.

Furthermore, since the tapered wall surfaces 111c, 112c of each fitting projection 111d, 112d are engaged with the tapered wall surfaces 112a, 111a of the corresponding fitting recess 112b, 111b, a space between the first core sub-part 111 and the second core sub-part 112 can be minimized. Thus, the magnetoresistance, which would be caused by the presence of the space between the first core sub-part 111 and the second core sub-part 112, can be reduced. As a result, the magnetic flux can be more effectively used, and thereby the efficiency of the motor can be improved. Furthermore, with the above arrangement, lost motions of the first core sub-part 111 and of the second core sub-part 112 can be advantageously reduced to reduce a deviation in the interval of the teeth 102, 103 and to reduce a deviation in the rotational axial of the core 101.

(2) Each of the first and second core sub-parts 111, 112 includes the corresponding ring sub-part 111e, 112e, which constitutes the corresponding axial half of the ring 104. Furthermore, the ring sub-part 111e of the first core sub-part 111 has one of any two adjacent teeth 102, 103 of the core 101, and the ring sub-part 112e of the second core sub-part 112 has the other one of the any two adjacent teeth 102, 103. With this arrangement, in the separate state where the first core sub-part 111 is separated from the second core sub-part 112, i.e., where the one of the any two adjacent teeth 102, 103 is separated from the other one of the any two adjacent teeth 102, 103, the winding wires are wound to the corresponding teeth 102, 103. Thus, the adjacent teeth 102, 103 do not interfere with each other in the winding operation of the wires around the corresponding teeth 102, 103, allowing the easy winding operation of the wires. This allows a reduction in a circumferential space between the extended portions 102a, 103a of the adjacent teeth 102, 103 of the assembled core 101, each of which extends in the circumferential direction at the radially outer end of the tooth 102, 103, thereby allowing a reduction in cogging torque of the motor. Furthermore, a space between the winding wire of the one of the adjacent teeth 102, 103 and the winding wire of the other one of the adjacent teeth 102, 103 can be reduced to increase a space factor of the winding wires. As a result, the efficiency of the motor can be improved. Furthermore, the multiple teeth (i.e., four teeth) 102, 103 are provided to each ring sub-part 111e, 112e, so that the number (two in the present embodiment) of components of the core 101 to be assembled can be reduced.

(3) Each fitting projection 111d, 112d is formed along the radially inner end (proximal end) of the projected part 102x, 103x of the corresponding tooth 102, 103, which axially projects from the corresponding ring sub-part 111e, 112e. Thus, the radially inner end (proximal end) of the projected part 102x, 103x of each tooth 102, 103, which axially projects from the corresponding ring sub-part 111e, 112e, is strongly supported by the corresponding fitting projection 111d, 112d. Thus, lost motion of the teeth 102, 103 can be limited.

(4) The first core sub-part 111 and the second core sub-part 112 are identical to one another, i.e., have the same product number, so that the number of types of components is advantageously reduced.

(5) The radially outer part of each fitting recess 111b, 112b is opened, and the circumferential width (i.e., the circumferential space) of the fitting recess 111b, 112b increases from the radially outer part of the fitting recess 111b, 112b toward the radially inner part of the fitting recess 111b, 112b. Furthermore, the circumferential width of each fitting projection 111d, 112d increases from the radially outer part of the fitting projection 111d, 112d toward the radially inner part of the fitting projection 111d, 112d. With this arrangement, removal of each fitting projection 111d, 112d from the corresponding fitting recess 112b, 111b in the radial direction can be advantageously limited. Furthermore, the tapered wall surfaces 111a, 112a, 111c, 112c are provided in the circumferential wall surfaces of the fitting recesses 111b, 112b and of the fitting projections 111d, 112d, so that the relatively large circumferential space is provided between each fitting recess 111b, 112b and the corresponding fitting projection 112d, 111d in the initial stage of the assembling operation of the first core sub-part 111 and the second core sub-part 112. As a result, even when the circumferential positional accuracy of each fitting recess 111b, 112b and the circumferential positional accuracy of the corresponding fitting projection 112d, 111d are not relatively high, the collision between the first core sub-part 111 and the second core sub-part 112 at each fitting recess 111b, 112b and the corresponding fitting projection 112d, 111d can be advantageously minimized.

(6) Each fitting projection 111d, 112d and the corresponding fitting recess 112b, 111b are bonded together by the bond, into which the magnetic powder is mixed. Thus, the magnetoresistance, which would be induced by the space between the first core sub-part 111 and the second core sub-part 112, can be further reduced.

The fifth embodiment can be modified as follows.

In the fifth embodiment, the present invention is embodied in the core 101, which is formed upon assembly of the first and second core sub-parts 111, 112. However, the present invention can be embodied in any other appropriate core, which is formed upon assembly of more than two core sub-parts in the axial direction. For example, the present invention can be embodied in a core that has three core sub-parts, each of which includes one of three axial parts of a ring and each of which includes teeth that are arranged 180 degree intervals in the circumferential direction of the core sub-part. In such a case, two of the three ring sub-portions can be installed to the other one of the three ring sub-portions.

In the fifth embodiment, the tapered wall surfaces 111a, 112a, 111c, 112c are provided to the circumferential wall surfaces of the fitting recess 111b, 112b and of the fitting projection 111d, 112d. Alternatively, the tapered wall surfaces can be provided in radial wall surfaces (radially inner end surfaces) of fitting recesses 111b, 112b and of the fitting projections 111d, 112d. Furthermore, the tapered wall surfaces can be provided in only one of the circumferential wall surfaces of the fitting recess 111b, 112b and of the fitting projection 111d, 112d. Even with this embodiment, the possibility of collision between the first core sub-part 111 and the second core sub-part 112 can be advantageously reduced, and the space between the fitting portion of the first core sub-part 111 and the fitting portion of the second core sub-part 112 can be reduced.

In the fifth embodiment, each fitting projection 111d, 112d is formed in the projected part 102x, 103x of the corresponding tooth 102, 103, which projects from the first axial end of the ring sub-part 111e, 112e, in such a manner that the fitting projection 111d, 112d is formed along the radially inner end of the projected part 102x, 103x of the corresponding tooth 102, 103. Alternatively, each fitting projection 111d, 112d can be formed in any other appropriate location (e.g., a location between adjacent teeth 102, 103).

In the fifth embodiment, the fitting recess 111b, 112b and the fitting projection 111d, 112d are configured such that the circumferential width of each fitting recess 111b, 112b and the circumferential width of each fitting projection 111d, 112d are increased from the radially outer part toward the radially inner part to have the wedge shaped transverse cross section. Alternatively, as long as the tapered wall surfaces, each of which is angled relative to the direction that is parallel to the axial direction of the core, are present, each fitting recess 111b, 112b and each fitting projection 111d, 112d can be changed to any other type of fitting portion.

In the fifth embodiment, the first core sub-part 111 and the second core sub-part 112 are identical to one another. Alternatively, the shape of the first core sub-part 111 and the shape of the second core sub-part 112 can be different from one another. For example, the fitting recesses can be provided only in the first core sub-part, and the corresponding fitting projections can be provided only in the second core sub-part.

Sixth Embodiment

Figure 14A:
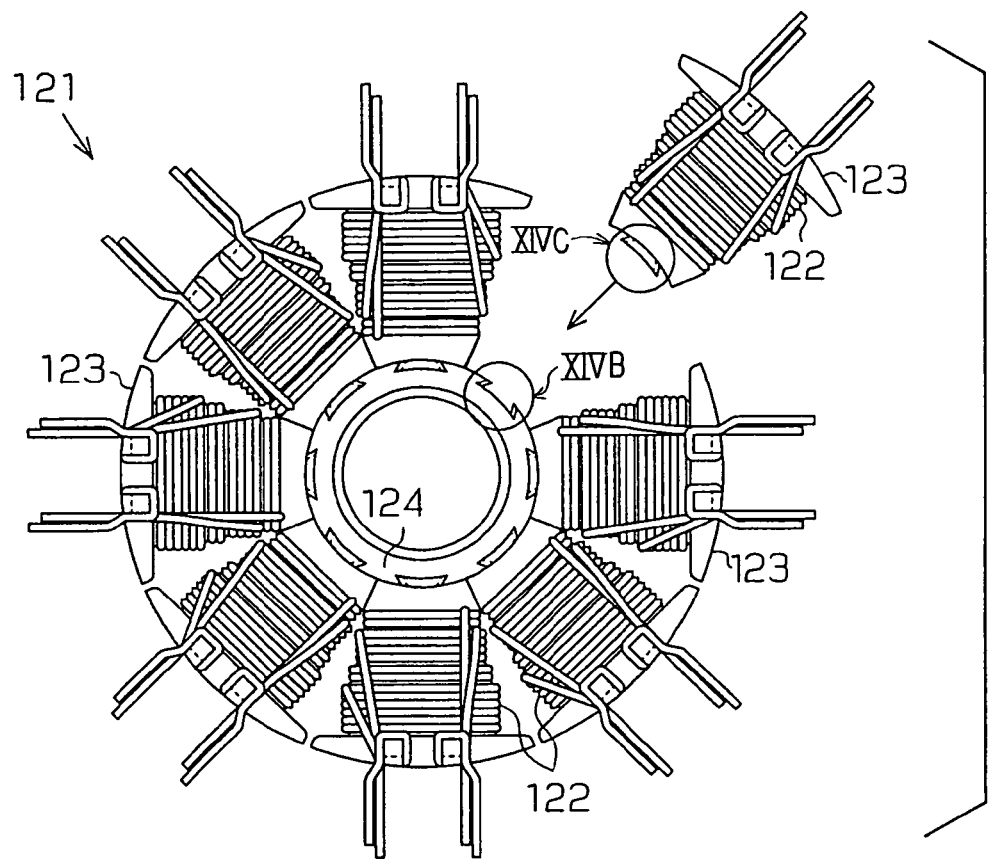
FIG. 14A is a partially exploded plan view of a core according to a sixth embodiment of the present invention.
Figure 14B:
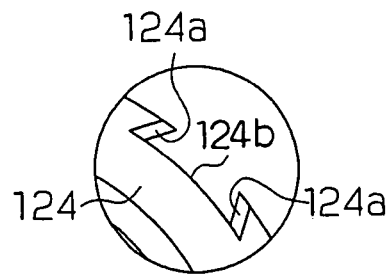
FIG. 14B is a partially enlarged view of a region 14B in FIG. 14A.
Figure 14C:
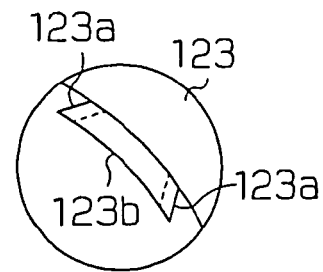
FIG. 14C is a partially enlarged view of a region 14C in FIG. 14A.

A sixth embodiment of the present invention will be described with reference to FIGS. 14A–14C.

A core 121 of the present embodiment includes a plurality of radially extending teeth 123 and a ring 124. Winding wires are wound around the corresponding teeth 123, and the teeth 123 serve as installable members of the present invention. The ring 124 connects radially inner ends (proximal ends) of the teeth 123 together and serves as a receiving member of the present invention. The core 121 is formed when the teeth 123 are axially installed to the ring 124.

Specifically, the ring 124 includes a plurality of fitting recesses 124b, which serve as receiving fitting portions (alternatively referred to as first type fitting portions) of the present invention. Each fitting recess 124b has two opposed tapered circumferential wall surfaces 124a, each of which is tilted, i.e., is angled relative to a direction that is parallel to an axial direction of the core 121. Each tooth 123 has a fitting projection 123b, which serves as an installable portion (alternatively referred to as a second type fitting portion) of the present invention. The fitting projection 123b of each tooth 123 has two opposed tapered circumferential wall surfaces 123a, each of which is angled relative to a direction parallel to the axial direction of the core 121. The ring 124 and the teeth 123 are assembled together in such a manner that the fitting projections 123b of the teeth 123 are engaged with the fitting recesses 124b of the ring 124, and the tapered wall surfaces 123a of the teeth 123 are engaged with the tapered wall surfaces 124a of the ring 124. A shape of each fitting recess 124b and a shape of each fitting projection 123b are substantially the same as the shape of each fitting recess 111b, 112b and the shape of each fitting projection 111d, 112d, respectively. Furthermore, the tapered wall surfaces 123a of each fitting projection 123b are angled in such a manner that a circumferential width (i.e., a circumferential space) between the tapered wall surfaces 123a of each fitting projection 123b increases in one axial direction (frontal direction that is perpendicular to the plane of FIG. 14A and extends on the front side of the plane of FIG. 14A). Similarly, the tapered wall surfaces 124a of each fitting recess 124b are angled in such a manner that a circumferential width (i.e., a circumferential space) between the tapered wall surfaces 124a of each fitting recess 124b increases in the one axial direction (the frontal direction that is perpendicular to the plane of FIG. 14A and extends on the front side of the plane of FIG. 14A).

Even with this embodiment, advantage similar to one discussed above in the section (1) of the fifth embodiment can be achieved. The winding wires 122 are wound around the corresponding teeth 123 while the teeth 123 are separated from the ring 124, so that the winding wires 122 can be easily wound around the corresponding teeth 123 without being interfered by the adjacent teeth 123. Furthermore, the teeth 123 are separately provided. Also, the circumferential width of each fitting recess 124b increases from the radially outer part of the fitting recess 124b toward the radially inner part of the fitting recess 124. Similarly, the circumferential width of each fitting projection 123b increases from the radially outer part of the fitting projection 123b toward the radially inner part of the fitting projection 123b. With this arrangement, the relatively large space is provided between each fitting recess 124b and the corresponding fitting projection 123b in the circumferential direction and also in the radial direction in the initial stage of the assembling operation of the teeth 123 to the ring 124. As a result, a possibility of collision between each tooth 123 and the ring 124 can be minimized without increasing positional accuracy of each fitting recess 124b and positional accuracy of the corresponding fitting projection 123b.

Seventh Embodiment

A seventh embodiment of the present invention will be described with reference to FIGS. 15 and 16.

Figure 15:
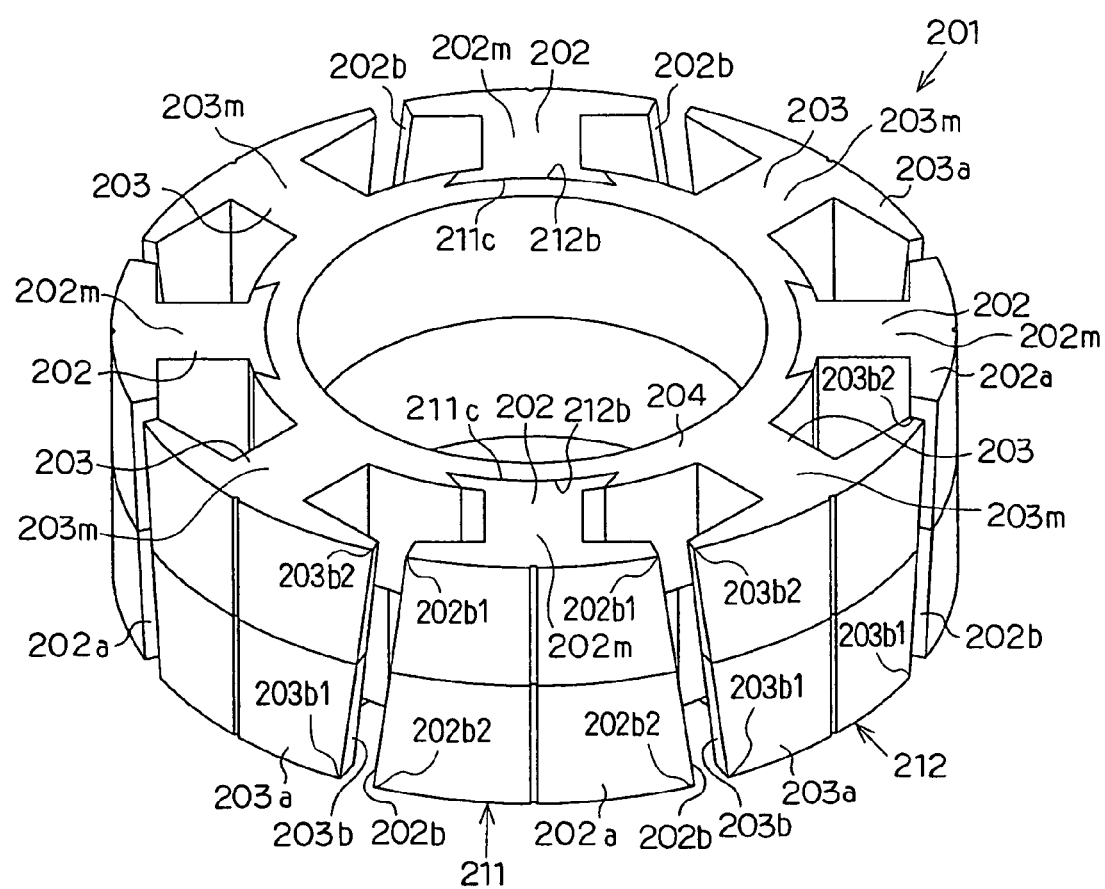
FIG. 15 is a perspective view of a core according to a seventh embodiment of the present invention.

As shown in FIG. 15, a core 201 of the present embodiment includes a plurality of radially extending teeth 202, 203 and a ring 204. Each tooth 202, 203 includes a tooth main body 202m, 203m and an extended portion 202a, 203a. The extended portion 202a, 203a extends circumferentially from a radially outer end (distal end) of the tooth main body 202m, 203m. The ring 204 connects radially inner ends (proximal ends) of the tooth main bodies 202m, 203m (i.e., the teeth 202, 203) together, and winding wires (not shown) are wound around the corresponding tooth main bodies 202, 203. In the present embodiment, the number of the teeth 202, 203 is eight, and these teeth 202, 203 are arranged at generally equal angular intervals (i.e., 45 degree intervals) in the circumferential direction of the core.

Figure 16:
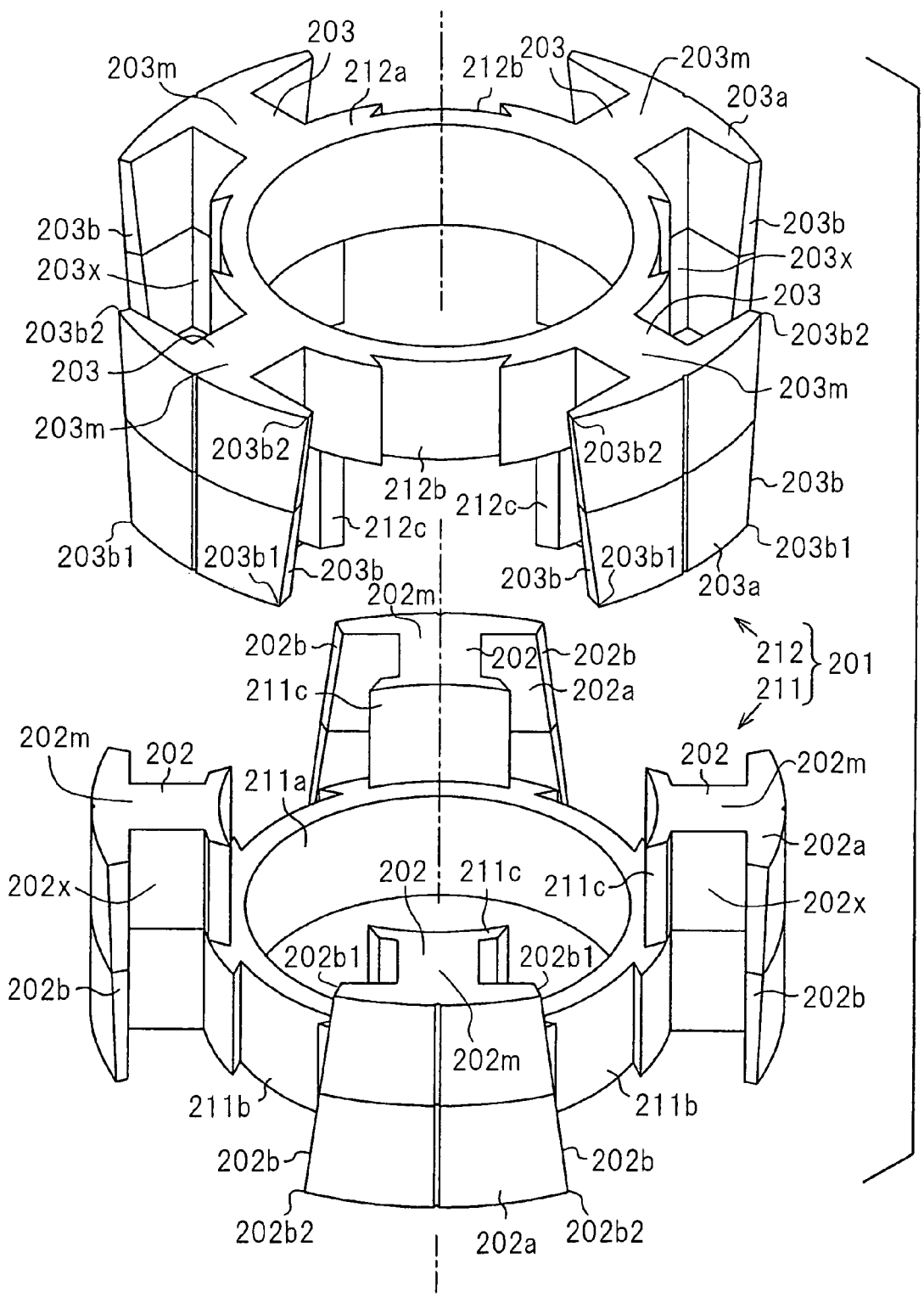
FIG. 16 is an exploded perspective view of the core of FIG. 15.

As shown in FIG. 16, the core 201 includes a first core sub-part 211 and a second core sub-part 212, which are axially assembled together to form the core 201. In the present embodiment, the first core sub-part 211 and the second core sub-part 212 are identical to one another, i.e., have the same product number. Each of the first and second core sub-parts 211, 212 is formed by compression molding of magnetic powder that includes powder particles, each of which has an oxide layer provided in its outer surface.

Each core sub-part 211, 212 includes a ring sub-part 211a, 212a, which constitutes a corresponding axial half of the ring 204. The teeth 202, 203 are provided to the ring sub-parts 211a, 212a such that the teeth 202 of the ring sub-part 211a and the teeth 203 of the ring sub-part 212a are alternately arranged in the circumferential direction of the core 201 when the first core sub-part 211 and the second core sub-part 212 are axially assembled together (FIG. 15). More specifically, in the present embodiment, each ring sub-part 211a, 212a includes four of the teeth 202, 203 which are arranged at 90 degree intervals. One half of an axial length of each tooth 202, 203 axially projects from a first axial end of the corresponding ring sub-part 211a, 212a (i.e., an upper axial end of the ring sub-part 211a and a lower axial end of the ring sub-part 212a in FIG. 16) to form a projected part 202x, 203x of the tooth 202, 203. A free axial end of the projected part 202x, 203x of the tooth 202, 203 forms a first axial end of the tooth 202, 203 (an upper axial end of the tooth 202 and a lower axial end of the tooth 203 in FIG. 16). With the above arrangement, the axial length of each tooth 202, 203 substantially coincides with an axial length of the ring 204 when the first core sub-part 211 and the second core sub-part 212 are assembled together, as shown in FIG. 15.

Each extended portion 202a, 203a has two length decreasing tapered wall surfaces 202b, 203b that serve as length decreasing portions of the present invention, each of which reduces an axial length of the extended portion 202a, 203a toward a circumferential end of the length decreasing portion. A first axial end 202b1, 203b1 of each tapered wall surface 202b, 203b (i.e., an upper axial end of the tapered wall surface 202b and a lower axial end of the tapered wall surface 203b in FIG. 16) is located in the free end of the projected part 202x, 203x of the tooth 202, 203 (i.e., one end of the extended portion 202a, 203a ), and a second axial end 202b2, 203b2 of each tapered wall surface 202b, 203b is located in the opposite end of the extended portion 202a, 203a. The axial length of the extended portion 202a, 203a decreases from the first axial end 202b1, 203b1 of the tapered wall surface 202b, 203b toward the second axial end 202b2, 203b2 of the tapered wall surface 202b, 203b. More specifically, the two tapered wall surfaces 202b, 203b of each extended portion 202a, 203a are formed in two opposed circumferential ends of the extended portion 202a, 203a. Furthermore, each tapered wall surface 202b, 203b is tilted, i.e., is angled relative to a direction parallel to an axial direction of the core 201 in such a manner that a circumferential width of the corresponding extended portion 202a, 203a decreases in a projecting direction of the projected part 202x, 203x of the tooth 202, 203 (an axial assembling direction of each core sub-part 211, 212, i.e., an axial assembling direction of the tooth 202, 203 relative to the other core sub-part 212, 211). That is, when the extended portion 202a, 203a is seen from a position that is located radially outward of the extended portion 202a, 203a, the extended portion 202a, 203a has a generally trapezoidal shape, which has a shorter one of two parallel sides located in the one axial end of the extended portion 202a, 203a. In the present embodiment, a first circumferential extent of each extended portion 202a, 203a, which is measured from the radially outer end of the tooth main body 202m, 203m in a first circumferential direction (e.g., a clockwise direction of the first core sub-part 211 in FIG. 16) is substantially the same as a second circumferential extent of the extended portion 202a, 203a, which is measured from the radially outer end of the tooth main body 202m, 203m in a second circumferential direction (e.g., a counterclockwise direction of the first core sub-part 211 in FIG. 16), which is opposite from the first circumferential direction. An angle between each tapered wall surface 202b, 203b and the direction parallel to the axial direction of the core 201 is substantially identical for all the tapered wall surfaces 202b, 203b.

As shown in FIG. 16, each core sub-part 211, 212 has a plurality of fitting recesses (receiving fitting portions or alternatively referred to as first type fitting portions) 211b, 212b and a plurality of fitting projections (installable fitting portions or alternatively referred to as second type fitting portions) 211c, 212c. In each core sub-part 211, 212, each fitting recess 211b, 212b is located between corresponding two of the teeth 202, 203, and a radially outer part of each fitting recess 211b, 212b is opened. Furthermore, each fitting recess 211b, 212b has a circumferential width (i.e., a circumferential space), which increases from a radially outer part of the fitting recess 211b, 212b toward a radially inner part of the fitting recess 211b, 212b. That is, each fitting recess 211b, 212b has a wedge shaped transverse cross section. Each fitting projection 211c, 212c is formed in the projected part 202x, 203x of the corresponding tooth 202, 203, which axially projects from the first axial end of the ring sub-part 211a, 212a, in such a manner that the fitting projection 211c, 212c is formed along the radially inner end (proximal end) of the projected part 202x, 203x of the corresponding tooth 202, 203 to coincide with the shape of the corresponding fitting recess 211b, 212b. That is, a circumferential width of the fitting projection 211c, 212c increases from a radially outer part of the fitting projection 211c, 212c toward a radially inner part of the fitting projection 211c, 212c.

The winding wires are wound around the corresponding tooth main bodies 202m, 203m of each of the first and second core sub-parts 211, 212 to form concentrated winding while the first and second core sub-parts 211, 212 are still separated from one another. Thereafter, the first core sub-part 211 and the second core sub-part 212 are axially opposed to one another in such a manner that each tooth 202, 203 of one of the first and second core sub-parts 211, 212 is circumferentially displaced by 45 degrees from a circumferentially adjacent one of the teeth 202, 203 of the other one of the first and second core sub-parts 211, 212. Then, the second core sub-part 212 is axially installed to the first core sub-part 211, so that the fitting projections 211c, 212c are engaged with the fitting recesses 212b, 211b. Furthermore, at the time of assembly, bond, into which magnetic powder is mixed, is applied to the fitting projections 211c, 212c and to the fitting recesses 211b, 212b. Thus, the fitting projections 211c, 212c are bonded with the corresponding fitting recesses 211b, 212b when the fitting projections 211c, 212c are engaged with the corresponding fitting recesses 212b, 211b. In the assembled core 201 of the present embodiment, a circumferential position (angular position) of the second axial end 202b2 of each tapered wall surface 202b of each tooth 202 of the first core sub-part 211 substantially coincides with a circumferential position (angular position) of the second axial end 203b2 of the axially opposed tapered circumferential wall surface 203b of an adjacent tooth 203 of the second core sub-part 212.

Advantages of the seventh embodiment will be described.

(1) In the separate state where the first core sub-part 211 is separated from the second core sub-part 212, i.e., where one of any two adjacent teeth 202, 203 is separated from the other one of the two adjacent teeth 202, 203, the winding wires are wound to the corresponding teeth 202, 203. Thus, the adjacent teeth 202, 203 (and the adjacent extended portions 202a, 203a ) do not interfere with each other in the winding operation of the wires around the corresponding teeth 202, 203, allowing easy winding operation of the wires. This also allows a reduction in a circumferential space between the circumferentially opposed extended portions 202a, 203a of the adjacent teeth 202, 203 of the assembled core 201, thereby allowing a reduction in cogging torque of the motor. Furthermore, the tapered wall surfaces 202b, 203b, each of which provides the decreasing axial length of the corresponding extended portion 202a, 203a toward its circumferential end, are formed in each extended portion 202a, 203a. Thus, an abrupt change in circumferential magnetoresistance is limited, and thereby the cogging torque of the motor can be further reduced. Furthermore, a space between the winding wire of the one of the adjacent teeth 202, 203 and the winding wire of the other one of the adjacent teeth 202, 203 can be reduced to increase a space factor of the winding wires.

(2) The tapered wall surfaces 202b, 203b are provided in the two circumferential end of each extended portion 202a, 203a and are angled such that the circumferential width of the extended portion 202a, 203a decreases in the projecting axial direction of the tooth 202, 203 (i.e., the axial assembling direction of the core sub-part 211, 212 relative to the other core sub-part 212, 211). With this arrangement, at the time of axially assembling the first and second core sub-parts 211, 212, a possibility of contact between each extended portion 202a, 203a of one of the first and second core sub-parts 211, 212 and adjacent ones of the extended portions 202a, 203a of the other one of the first and second core sub-parts 211, 212 can be advantageously reduced, and a circumferential space between the adjacent extended portions 202a, 203a can be minimized. In the present embodiment, the circumferential position of the second axial end 202b2, 203b2 of each tapered wall surface 202b, 203b of each tooth 202, 203 of the one of the first and second core sub-parts 211, 212 substantially coincides with the circumferential position of the second axial end 203b2, 202b2 of the circumferentially opposed tapered circumferential wall surface 203b, 202b of the adjacent tooth 203, 202 of the other one of the first and second core sub-parts 211, 212. However, at the time of axial assembly of the first and second core sub-parts 211, 212, the shorter side of each extended portion 202a, 203a of the one of the first and second core sub-parts 211, 212 is axially opposed to a relatively large space defined between corresponding two extended portions 202a, 203a of the other one of the first and second core sub-parts 211, 212. Thus, collision between each extended portion 202a, 203a of the one of the first and second core sub-parts 211, 212 and the opposed extended portions 202a, 203a of the other one of the first and second core sub-parts 211, 212 can be relatively easily avoided.

(3) Each core sub-part 211, 212 includes the ring sub-part 211a, 212a of the ring 204, which constitutes the corresponding axial half of the ring 204. The teeth 202, 203 are provided to the ring sub-parts 211a, 212a such that the teeth 202 of the ring sub-part 211a and the teeth 203 of the ring sub-part 212a are alternately arranged in the circumferential direction of the core 201 when the first core sub-part 211 and the second core sub-part 212 are axially assembled together. With this arrangement, each ring sub-part 211a, 212a has multiple (four) teeth 202, 203. This allows a reduction in the number of components (two in the present embodiment) axially assembled together, allowing easy assembly operation of the core 201 (and of the motor).

(4) The first and second core sub-parts 211, 212 are identical to one another, i.e., have the same product number, so that the number of types of components of the core 201 (and of the motor) can be reduced.

Eighth Embodiment

An eighth embodiment of the present invention will be described with reference to FIGS. 17–19. Components similar to the seventh embodiment will be indicated by the same numerals and will not be described further for the sake of simplicity.

Figure 17:
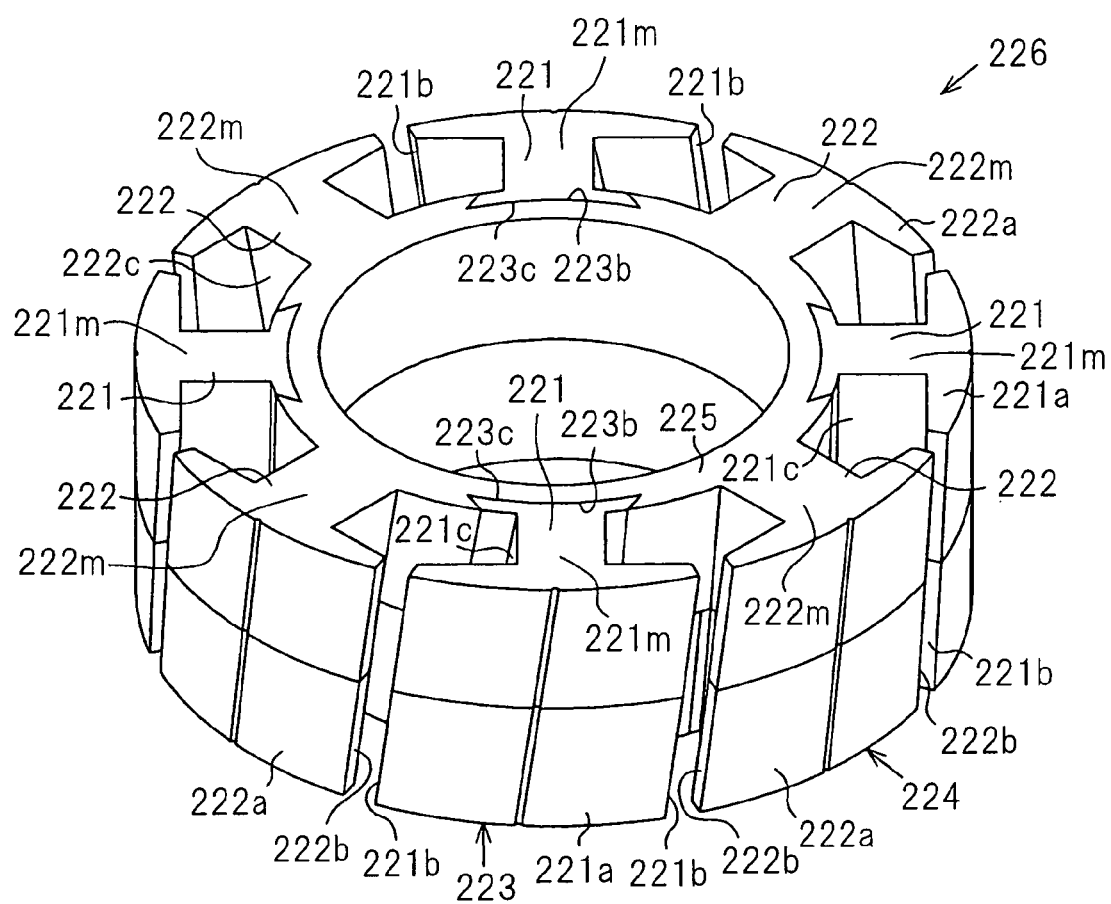
FIG. 17 is a perspective view of a core according to an eighth embodiment of the present invention.
Figure 18:
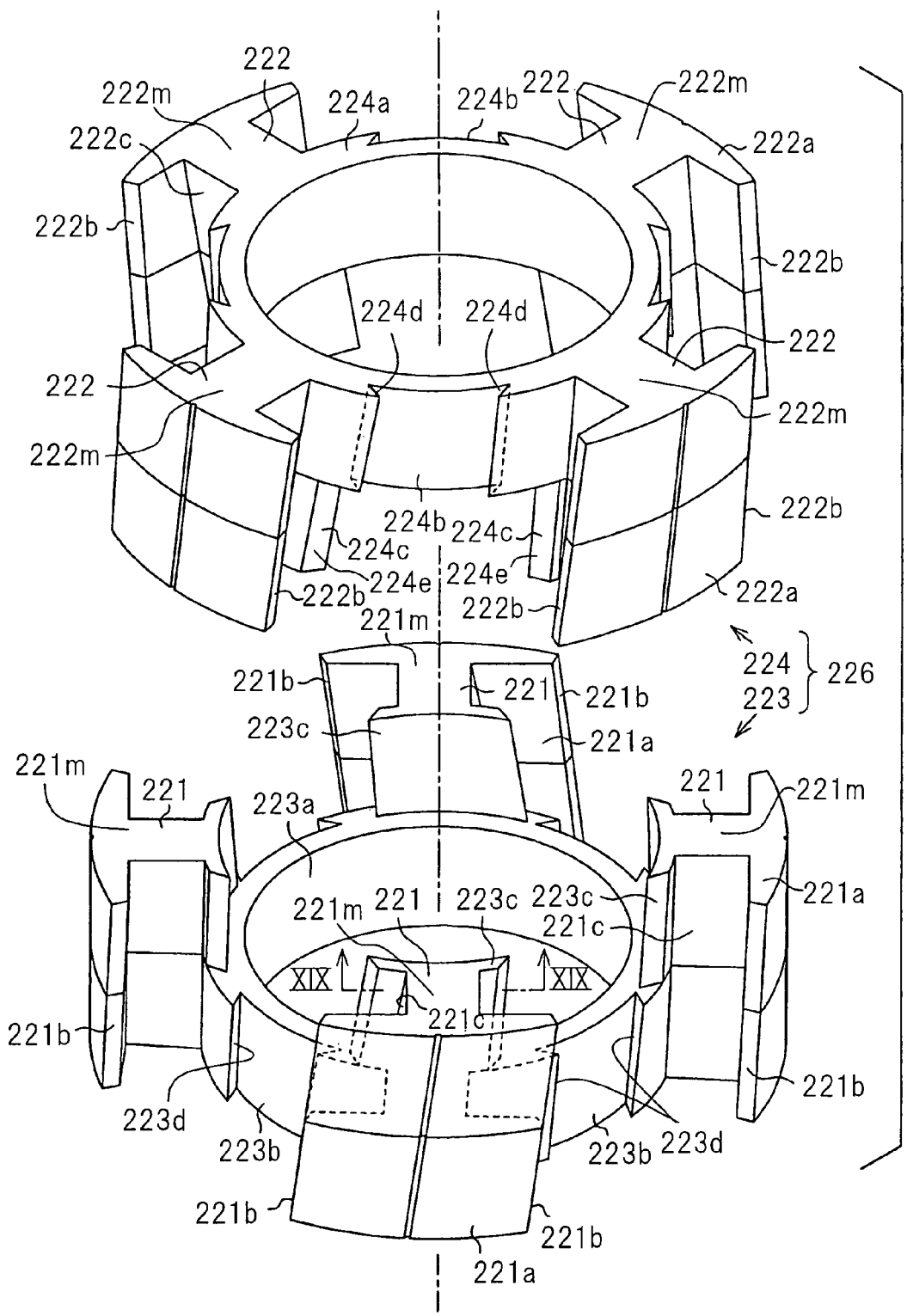
FIG. 18 is an exploded perspective view of the core of FIG. 17.

As shown in FIGS. 17 and 18, the length decreasing tapered wall surfaces 202b, 203b of each extended portion 202a, 203a of the seventh embodiment can be changed to parallel tapered wall surfaces 221b, 222b, which are provided to each extended portion 221a, 222a and are tilted to extend in a parallel relationship to each other, as shown in FIGS. 17 and 18.

Specifically, each of first and second core sub-parts 223, 224 includes a ring sub-part 223a, 224a (FIG. 18), which constitutes a corresponding axial half of a ring 25 (FIG. 17). Each ring sub-part 223a, 224a includes teeth 221, 222. The teeth 221 of the ring sub-part 223a and the teeth 222 of the ring sub-part 224a are alternately arranged in a circumferential direction of a core 226 when the first and second core sub-parts 223, 224 are axially assembled together, as shown in FIG. 17.

An extended portion 221a, 222a is provided to a radially outer end (distal end) of a tooth main body 221m, 222m of each tooth 221, 222 to extend in a circumferential direction. The two parallel tapered wall surfaces 221b, 222b, which are tilted relative to the direction parallel to the axial direction of the core 226 in a parallel relationship to each other, are provided to two circumferential ends of each extended portion 221a, 222a.

As shown in FIG. 18, each core sub-part 223, 224 has a plurality of fitting recesses (tilted receiving fitting portions or alternatively referred to as tilted first type fitting portions) 223b, 224b and fitting projections (tilted installable fitting portions or alternatively referred to as tilted second type fitting portions) 223c, 224c. Two circumferential wall surfaces 223d, 224d of each fitting recess 223b, 224b and two circumferential wall surfaces 23e, 224e of each fitting projection 223c, 224c are tilted in parallel with the corresponding parallel tapered wall surfaces 221b, 222b.

Figure 19:
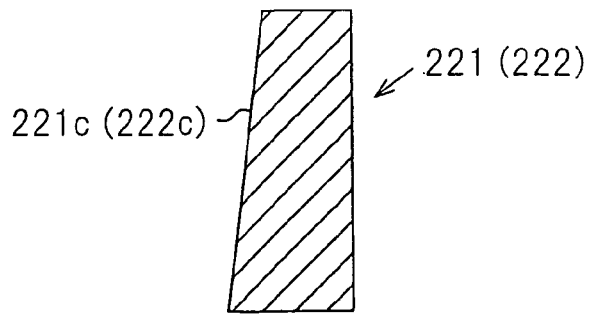
FIG. 19 is a cross sectional view along line XIX—XIX in FIG. 18.

As shown in FIG. 19, one of two circumferential end wall surfaces of each tooth 221, 222 (more specifically, each tooth main body 221m, 222m) is tilted generally in parallel to the parallel tapered wall surfaces 221b, 222b to form a tilted tooth wall surface 221c, 222c. Here, it should be noted that the other one of the circumferential end wall surfaces of each tooth 221, 222 (each tooth main body 221m, 222m) can be tilted generally in parallel to the parallel tapered wall surfaces 221b, 222b to form another tilted tooth wall surface.

The first and second core sub-parts 223, 224 are axially assembled together when each fitting projection 223c, 224c is fitted, i.e., is engaged with the corresponding fitting recess 223b, 224b. At the time of axially assembling the first and second core sub-parts 223, 224 together, since each fitting recess 223b, 224b and the corresponding fitting projection 223c, 224c are tilted generally in parallel to the corresponding parallel tapered wall surfaces 221b, 222b, the second core sub-part 224 are rotated relative to the first core sub-part 223 to insert each tooth 222 of the second core sub-part 224 between the corresponding adjacent teeth 221 of the first core sub-part 223 in such a manner that the parallel tapered wall surfaces 222b of the extended portion 222a of the tooth 222 are moved in parallel with the opposed parallel tapered wall surfaces 221b of the extended portions 221a of the teeth 221 without contacting them.

Thus, collision between the extend portions 222a of the second core sub-part 224 and the extended portions 221a of the first core sub-part 223 can be avoided, and a circumferential space between each extended portion 221a, 222a and its adjacent extended portion 221a, 222a can be minimized in the assembled core 226. That is, in the case where the length decreasing portions are formed as the parallel tapered wall surfaces 221b, 222b, when each fitting recess and the corresponding fitting projection are formed to extend in the axial direction of the core like in the above embodiment, a relatively large circumferential space needs to be provided between the circumferential end wall of the fitting recess and the opposed circumferential end wall of the fitting projection to avoid collision between them. Contrary to this, in the present embodiment where each fitting recess 223b, 224b and the corresponding fitting projection 223c, 224c are tilted generally in parallel to the parallel tapered wall surfaces 221b, 222b, each extended portion 221a, 222a of one of the first and second core sub-parts 223, 224 is received between the corresponding adjacent extended portions 221a, 222a of the other one of the first and second core sub-parts 223, 224 generally along the parallel tapered wall surfaces 221b, 222b, so that the collision can be avoided even when the circumferential space between the extended portions 221a, 222a is reduced.

Furthermore, each tooth 221, 222 has the tilted tooth wall surface 221c, 222c. Thus, at the time of axially assembling the first and second core sub-parts 223, 224 together, the winding wire, which is wound around one tooth 221, 222 of one of the first and second core sub-parts 223, 224 is less likely to collide with the winding wire, which is wound to the adjacent tooth 221, 222 of the other one of the first and second core sub-parts 223, 224. Furthermore, a circumferential space between the winding wires of the assembled core 226 can be minimized. Thus, a space factor of the winding wires can be further improved.

In the above embodiment, the core 201 is made from the first and second core sub-parts 211, 212. However, as long as the core is made from a plurality of core sub-parts, which are axially assembled together, the first and second core sub-parts 211, 212 can be changed to any other core sub-parts.

Ninth Embodiment

Figure 20A:
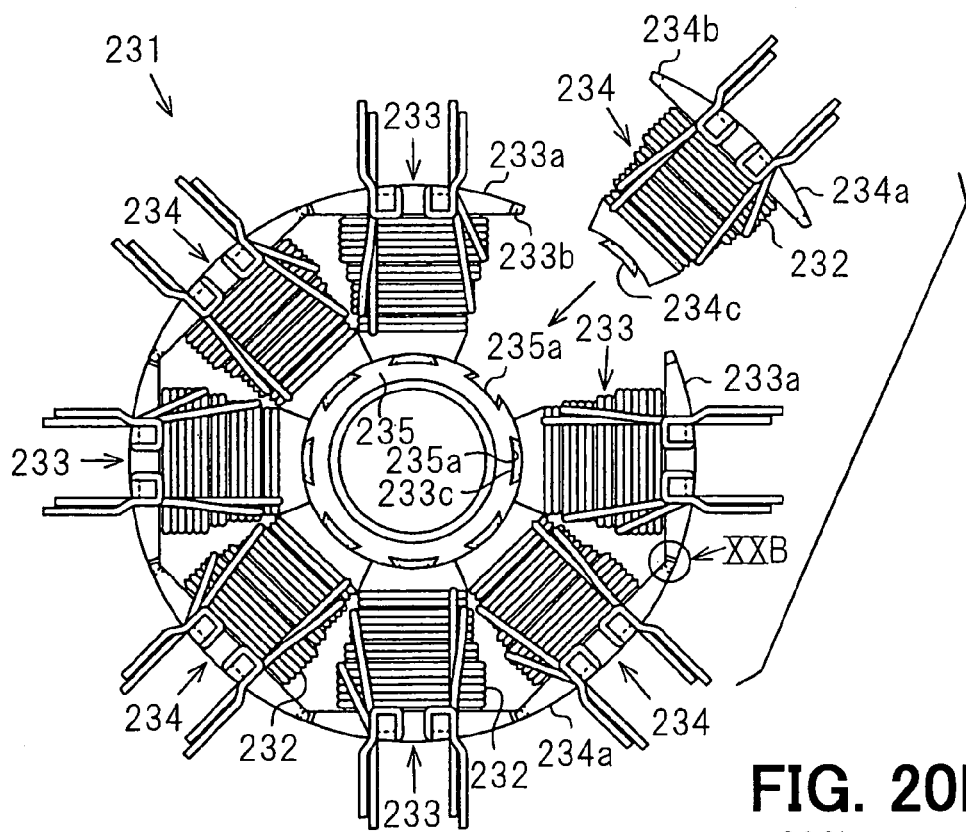
FIG. 20A is a partially exploded plan view of a core according to a ninth embodiment of the present invention.
Figure 20B:
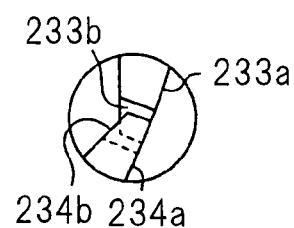
FIG. 20B is a partially enlarged view of a region 20B in FIG. 20A.
Figure 21:
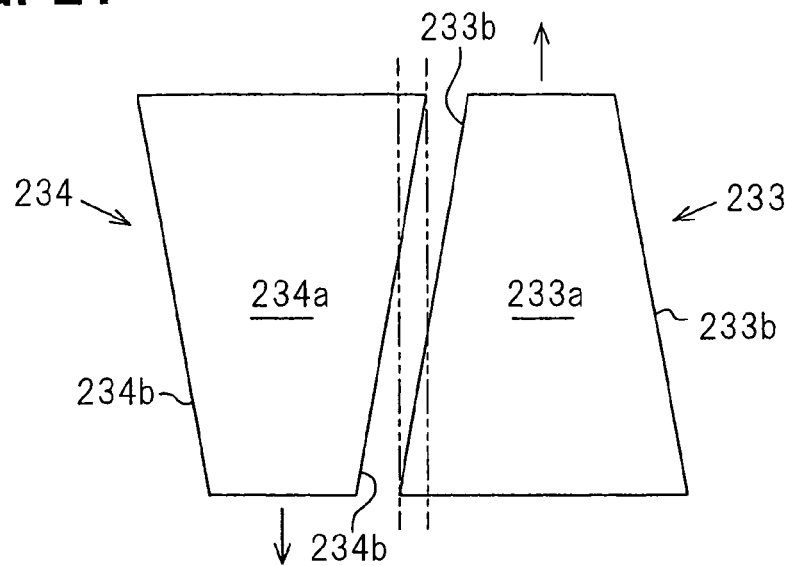
FIG. 21 is a partial radial view showing two adjacent extended portions of the core of FIGS. 20A and 20B.

A ninth embodiment of the present invention will be described with reference to FIGS. 20A–21.

A core 231 of the present embodiment includes a plurality (eight in this instance) of radially extending teeth 233, 234 and a ring 235. The ring 235 connects radially inner ends (proximal ends) of the teeth 233, 234 together. In this instance, the teeth 233, 234 and the ring 235 are axially assembled together.

An extended portion 233a, 234a of each tooth 233, 234 has two length decreasing tapered wall surfaces 233b, 234b. Each length decreasing tapered wall surface 233b, 234b serves as a length decreasing portion of the present invention that reduces an axial length of the extended portion 233a, 234a toward a circumferential end of the length decreasing portion. Specifically, the tapered wall surfaces 233b, 234b are formed in two circumferential ends of each extended portion 233a, 234a. Furthermore, each tapered wall surface 233b, 234b is tilted such that a circumferential width of the extended portion 233a, 234a decreases toward a distal end (leading end) of the extended portion 233a, 234a in an axial assembling direction relative to the other extended portions. That is, when the extended portion 233a, 234a is seen from a position, which is located radially outward of the extended portion 233a, 234a (FIG. 21), the extended portion 233a, 234a is formed into a generally trapezoidal shape, which has a shorter one of parallel sides located on the axial assembling direction (indicated by an arrow in FIG. 21) side of the extended portion 233a, 234a. In the core 231 of this instance, circumferentially opposed adjacent tapered wall surfaces 233b, 234b of the adjacent teeth 233, 234 partially overlap with one another in the circumferential direction (see a partial enlarged view of FIG. 20B and FIG. 21). A plurality of fitting recesses 235a is formed in the ring 235, and a fitting projection 233c, 234c is provided in each tooth 233, 234.

Winding wires 232 are wound around the teeth 233, 234 (more specifically, tooth main bodies similar to those discussed above) while the teeth 233, 234 are not assembled to the ring 235. Then, a first group of teeth 233, which are arranged at 90 degree intervals in the assembled core 231, is axially moved to the ring 235, so that the fitting projection 233c of each tooth 233 is engaged with the corresponding one of the fitting recesses 235a. Thereafter, a second group of teeth 234 is axially moved to the ring 235 in such a manner that the shorter axial end of the extended portion 234a of the tooth 234, which has a circumferential width shorter than the other axial end of the extended portion 234a of the tooth 234, becomes a leading end of the extended portion 234a of the tooth 234 and is moved toward the ring 235 (extended portions 233a ) in the axial direction (see the arrow in FIG. 21). Then, the fitting projection 234c is engaged with the corresponding fitting recess 235a.

Even with this embodiment, the cogging torque can be reduced by the length decreasing tapered wall surfaces 233b, 234b of the extended portions 233a, 234a. The teeth 233, 234 and the ring 235 constitute the core sub-parts of the core and are joined at the radially inner end of the teeth 233, 234. Thus, the core sub-parts are simplified. Furthermore, the wires are wound around the teeth 233, 234 while the teeth 233, 234 are separated from the ring 235, so that the winding operation of the wires around the teeth 233, 234 is simplified.

The length decreasing tapered wall surfaces 233b, 234b of the adjacent teeth 233, 234 are circumferentially overlapped, so that generation of the cogging torque can be further reduced. Also, in the case of the core 201 of the seventh embodiment, it should be noted that the length decreasing tapered wall surfaces 202b, 203b of the adjacent teeth 202, 203 may be circumferentially overlapped.

Furthermore, in the seventh and ninth embodiments, each extended portion 202a, 203a, 233a, 234a has the generally trapezoid shape when the extended portion 202a, 203a, 233a, 234a is seen from the radial direction. However, the shape of the respective extended portions 202a, 203a, 233a, 234a can be changed to any other shape as long as the length decreasing portions are provided to the extended portions 202a, 203a, 233a, 234a.

Tenth Embodiment

A tenth embodiment of the present invention will be described with reference to FIG. 22. Components similar to those of the seventh embodiment will be indicated by the same numerals and will be not described further for the sake of the simplicity.

Figure 22:
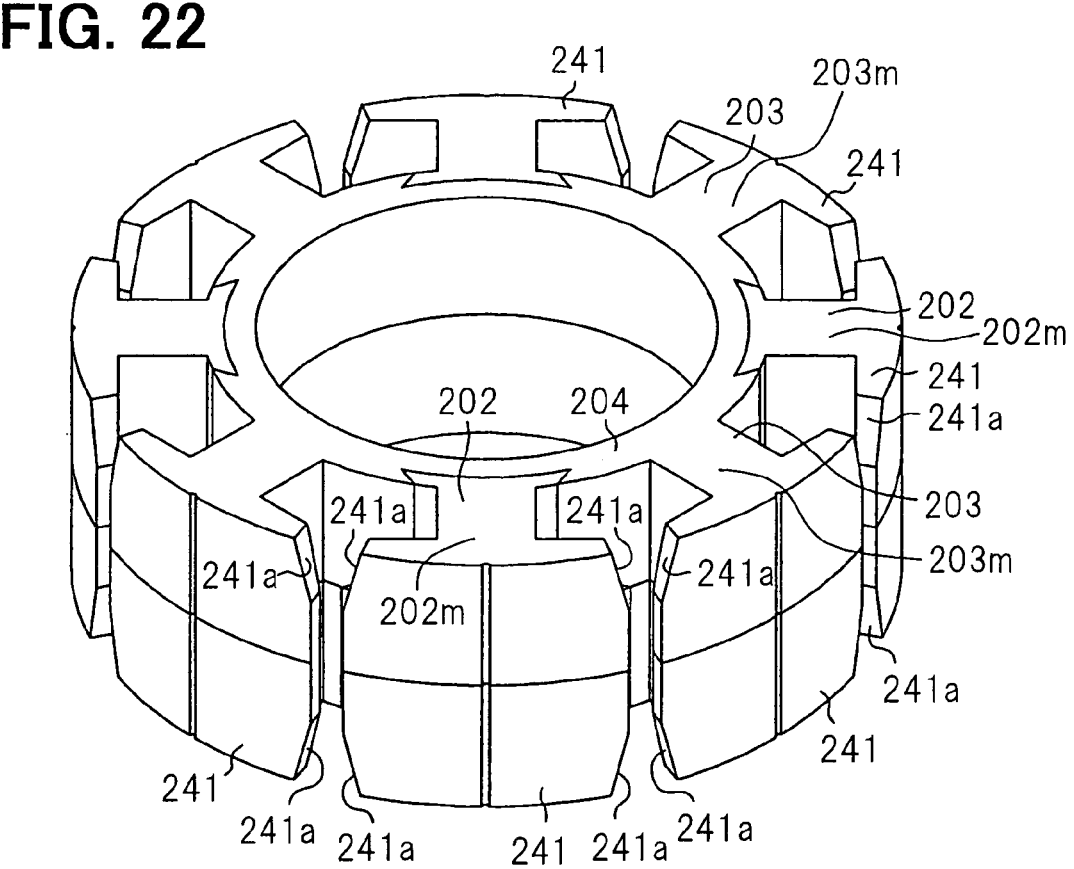
FIG. 22 is a perspective view of a core according to a tenth embodiment of the present invention.

With reference to FIG. 22, each extended portion of the seventh embodiment can be changed to an extended portion 241, which has an octagon shape when the extended portion 241 is seen from a position that is located radially outward of the extended portion 241. In this case, two tapered wall surfaces 241a are formed at axial ends of each circumferential end of the extended portion 241. Even with this embodiment, the wires can be easily wound around the teeth 202, 203, and generation of the cogging torque can be reduced.

Eleventh Embodiment

An eleventh embodiment of the present invention will be described with reference to FIG. 23. Components similar to those of the tenth embodiment will be indicated by the same numerals and will not be described further for the sake of the simplicity.

Figure 23:
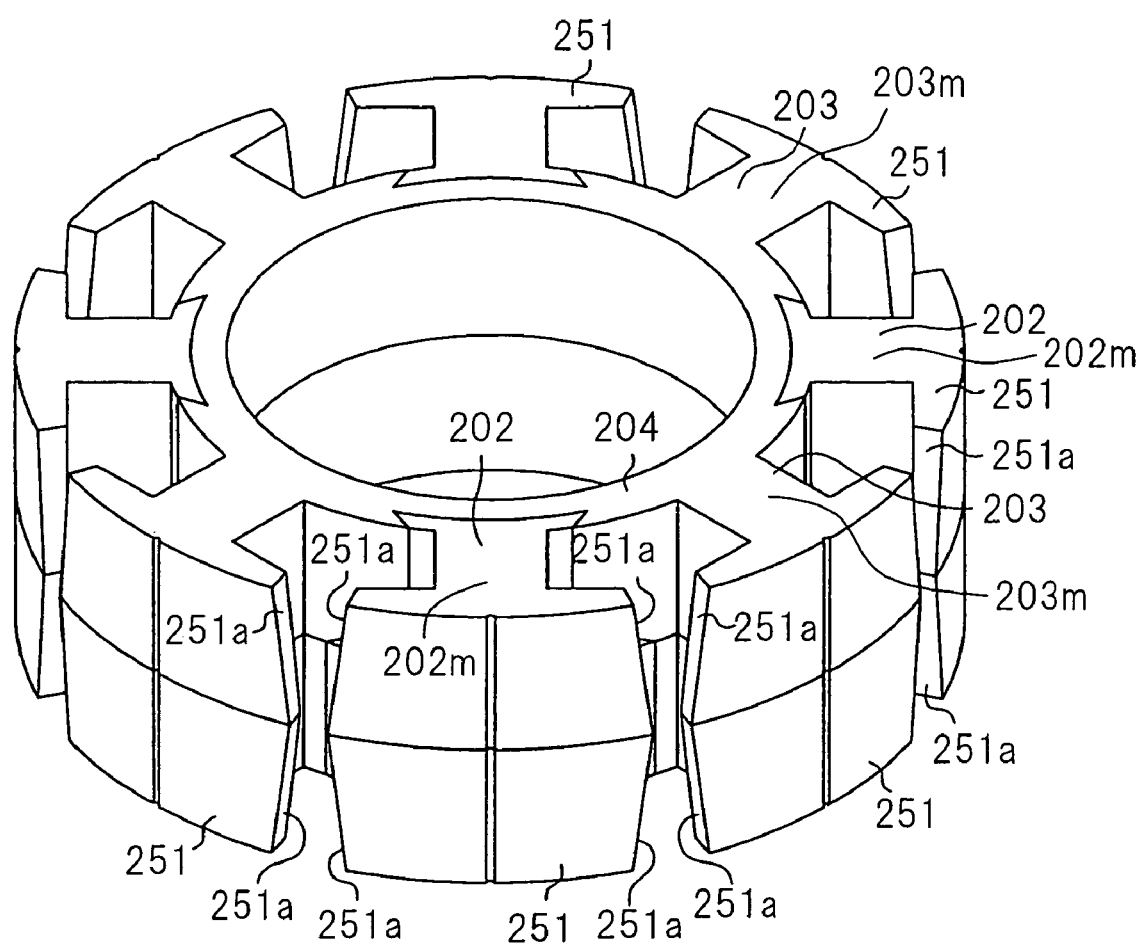
FIG. 23 is a perspective view of a core according to an eleventh embodiment of the present invention.

With reference to FIG. 23, each extended portion of the tenth embodiment can be changed to an extended portion 251, which has a hexagon shape when the extended portion 251 is seen from a position that is located radially outward of the extended portion 251. In this case, two axially opposed tapered wall surfaces 251a are formed at each circumferential end of the extended portion 251. Even with this embodiment, the wires can be easily wound around the teeth 202, 203, and generation of the cogging torque can be reduced.

The above embodiments can be modified as follows.

In the seventh to eleventh embodiments, curved length decreasing portions, i.e., tapered curved wall surfaces, each of which reduces an axial length of the extended portion toward a circumferential end of the length decreasing portion, can be formed in each extended portion in place of the planar tapered wall surface of the extended portion described above.

In the above embodiments, the first and second core sub-parts are identical to one another. Alternatively, the shape of the first core sub-part and the shape of the second core sub-part can be different from one another. For example, the fitting recesses can be provided only in the first core sub-part, and the corresponding fitting projections can be provided only in the second core sub-part.

In the above embodiments, the core is used in the armature of the direct-current motor. Alternatively, the core can be used as a core of any other dynamo-electric machine (e.g., a core of a stator of a brushless motor).

In the above embodiments, the fitting recesses are used as the first fitting portions of the present invention, and the fitting projections are used as the second fitting portions of the present invention. Alternatively, the fitting projections can be used as first fitting portions of the present invention, and the fitting recesses can be used as the second fitting portions of the present invention.

In each of the first to eleventh embodiments, each core sub-part is made from magnetic powder by compression molding. Alternatively, each core sub-part can be formed by stacking a plurality of metal plates. Also, each core sub-part can be formed by any other appropriate manner.

Furthermore, it should be noted that any features of the first to eleventh embodiments can be combined in any combination, if desired.

Additional advantages and modifications will readily occur to those skilled in the art. The invention in its broader terms is therefore not limited to the specific details, representative apparatus, and illustrative examples shown and described.

What is claimed is:

1. A core for a dynamo-electric machine, the core comprising a plurality of core sub-parts, which are assembled together in an axial direction of the core, wherein:

at least two of the plurality of core sub-parts have at least one tooth; and each tooth has a tooth main body, which includes two tilted portions at two opposed circumferential ends, respectively, of the tooth main body, wherein each tilted portion is angled relative to a corresponding direction parallel to the axial direction of the core, so that a circumferential width of the tooth main body decreases in an assembling direction of the tooth.

2. The core according to claim 1, wherein each of two opposed axial ends of each circumferential end of the tooth main body has a chamfered portion that is in a form of one of a curved wall surface and a planar wall surface.

3. The core according to claim 1, wherein:

each core sub-part has the at least one tooth;

the at least one tooth of each core sub-part includes a plurality of teeth;

each core sub-part further has a ring sub-part; and the teeth of each core sub-part extend radially from the ring sub-part and are arranged at generally equal angular intervals in a circumferential direction of the core.

4. The core according to claim 1, wherein each core sub-part is made from magnetic powder by compression molding.

5. A dynamo-electric machine member for a dynamo-electric machine, the dynamo-electric machine member comprising:

a core that includes a plurality of core sub-parts, which are assembled together in an axial direction of the core, wherein:

at least two of the plurality of core sub-parts have at least one tooth; and each tooth has a tooth main body, which includes two tilted portions at two opposed circumferential ends, respectively, of the tooth main body, wherein each tilted portion is angled relative to a corresponding direction parallel to the axial direction of the core, so that a circumferential width of the tooth main body decreases in an assembling direction of the tooth; and a plurality of winding wires, each of which is wound around a corresponding one of the teeth of the core.

6. The dynamo-electric machine member according to claim 5, wherein two of the wires, which are wound around any adjacent two of the teeth of the core, overlap with one another in a circumferential direction of the core and are spaced from one another in the circumferential direction of the core.

7. The dynamo-electric machine member according to claim 5, wherein two of the wires, which are respectively wound around any adjacent two of the teeth of the core, overlap with one another in a circumferential direction of the core and are engaged with one another at a predetermined pressure.

* * * * *